United States Patent
Matsumoto et al.

(10) Patent No.: US 11,054,359 B2
(45) Date of Patent: Jul. 6, 2021

(54) SAMPLE PROCESSING APPARATUS, SAMPLE PROCESSING SYSTEM, AND MEASUREMENT TIME CALCULATION METHOD

(71) Applicant: SYSMEX CORPORATION, Kobe (JP)

(72) Inventors: Shohei Matsumoto, Kobe (JP); Chikako Murata, Kobe (JP); Kenichiro Suzuki, Kobe (JP)

(73) Assignee: Sysmex Corporation, Kobe (JP)

( * ) Notice: Subject to any disclaimer, the term of this patent is extended or adjusted under 35 U.S.C. 154(b) by 137 days.

(21) Appl. No.: 16/058,321

(22) Filed: Aug. 8, 2018

(65) Prior Publication Data

US 2019/0049357 A1 Feb. 14, 2019

(30) Foreign Application Priority Data

Aug. 9, 2017 (JP) .............................. JP2017-154782

(51) Int. Cl.
*G01N 15/14* (2006.01)
*G06K 9/00* (2006.01)

(52) U.S. Cl.
CPC ....... *G01N 15/1429* (2013.01); *G01N 15/147* (2013.01); *G01N 15/1468* (2013.01); *G06K 9/00134* (2013.01); *G01N 2015/1486* (2013.01)

(58) Field of Classification Search
CPC ......... G06T 7/0012; G06T 2207/30024; G06T 2207/10056; G06T 2207/10101;
(Continued)

(56) References Cited

U.S. PATENT DOCUMENTS

| 5,319,575 A | 6/1994 | Lilienfeld |
| 5,488,469 A | 1/1996 | Yamamoto et al. |

(Continued)

FOREIGN PATENT DOCUMENTS

| EP | 0633462 A2 | 1/1995 |
| JP | H5-180831 A | 7/1993 |

(Continued)

OTHER PUBLICATIONS

Japanese Office Action dated May 18, 2021 in a counterpart Japanese patent application No. 2017-154782.

*Primary Examiner* — Allahyar Kasraian
(74) *Attorney, Agent, or Firm* — Brinks Gilson & Lione

(57) ABSTRACT

In view of such problems, the present invention provides a sample processing apparatus, a sample processing system, and a method of calculating measurement time, which allow an operator to efficiently capture images of cells. This invention relates to a sample processing apparatus 10 for measuring and analyzing a measurement sample 22. The sample processing apparatus 10 includes a light source 121 that irradiates light to the measurement sample 22, an imaging unit 154 that images light generated from the measurement sample 22 by irradiation with light, concentration information of cells included in the measurement sample 22 And a processing unit 11 that calculates a time required for cell imaging. The required time includes the time required for the processing of the image captured by the imaging unit 154 and the time required for the analysis of the image processed by the imaging unit 154.

20 Claims, 16 Drawing Sheets

(58) Field of Classification Search
CPC ..... G06T 7/0014; G06T 7/40; G01N 15/1475; G01N 15/147; G01N 2015/1481; G01N 15/06; G01N 2015/0668; G01N 2015/0687; G01N 2015/0693; G01N 15/1429; G01N 15/1468; G01N 2015/1486; G01N 15/1434; G01N 15/1436; G01N 2015/144; G01N 2015/0065; G01N 2015/008; G06K 9/00127; G06K 9/00147; G06K 9/00134; G06K 9/00604; G06K 2009/00932; G06K 9/0014

See application file for complete search history.

(56) References Cited

U.S. PATENT DOCUMENTS

| | | |
|---|---|---|
| 9,500,581 B2 | 11/2016 | Yamada et al. |
| 2010/0101339 A1 | 4/2010 | Tatsutani et al. |
| 2012/0134571 A1* | 5/2012 | Ito .............................. G06T 1/00 382/133 |
| 2013/0302906 A1 | 11/2013 | Tanabe |
| 2016/0151010 A1* | 6/2016 | Erez ................. A61B 5/150717 600/365 |
| 2016/0290862 A1* | 10/2016 | Ikku ......................... G01J 3/28 |
| 2017/0122869 A1 | 5/2017 | Yoshikawa |
| 2017/0143212 A1* | 5/2017 | Ishikawa .............. A61B 5/0082 |
| 2018/0007319 A1* | 1/2018 | Winkelman ......... G01N 1/2813 |
| 2018/0276246 A1* | 9/2018 | Matsumoto .......... G06K 9/0014 |

FOREIGN PATENT DOCUMENTS

| | | |
|---|---|---|
| JP | 2007-093470 A | 4/2007 |
| JP | 2007-304044 A | 11/2007 |
| JP | 2010-133917 A | 6/2010 |
| JP | 2017-83426 A | 5/2017 |
| WO | 2012/099234 A1 | 7/2012 |

* cited by examiner

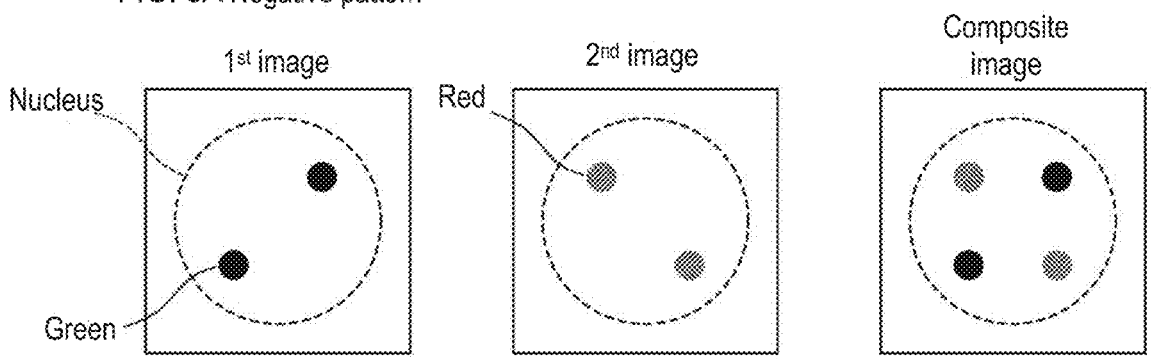
FIG. 3A Negative pattern
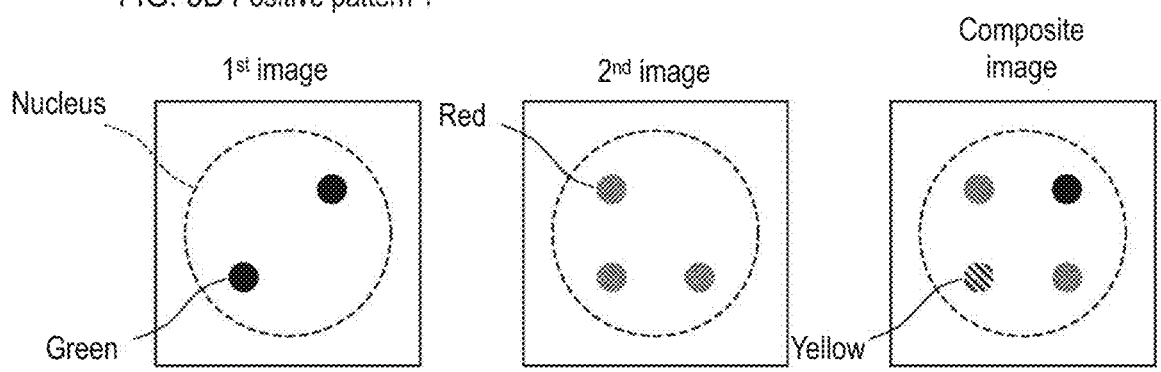
FIG. 3B Positive pattern 1
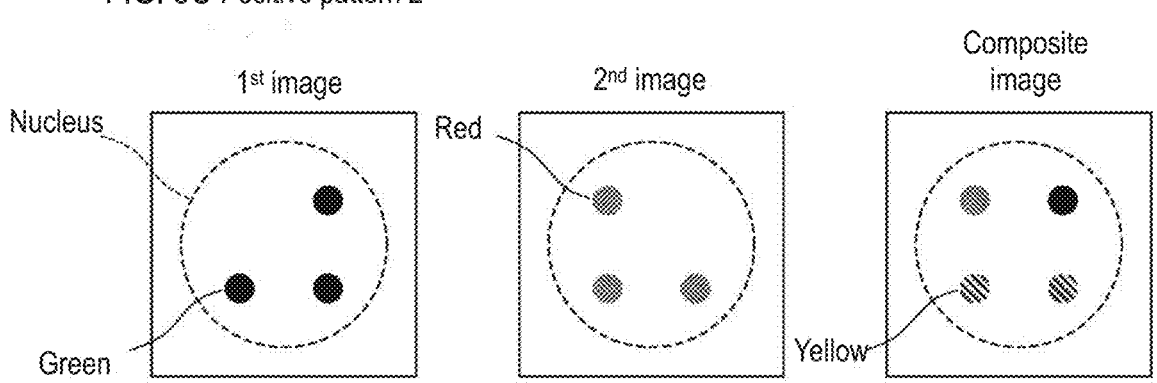
FIG. 3C Positive pattern 2
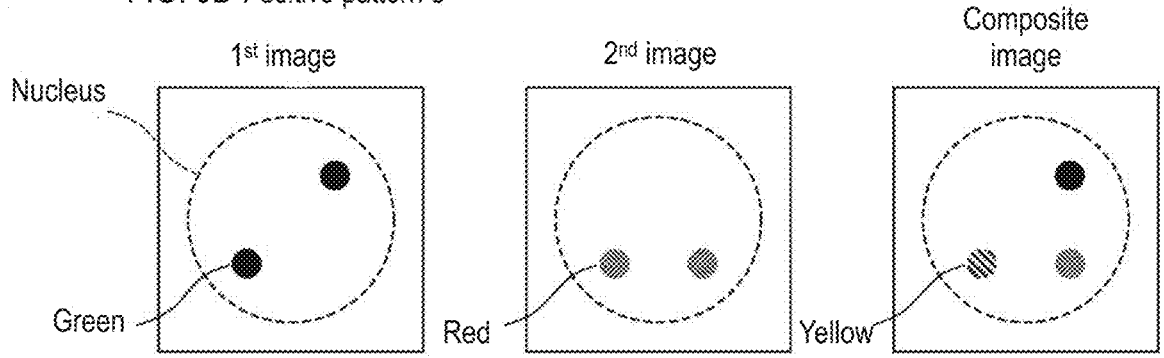
FIG. 3D Positive pattern 3

FIG. 7A

Sample ID : 20386
Cell concentration : 10000 cells / μL
Imaging cell number : 10000 cells Required time : 10 minutes Set  Change Start measurement?  YES  NO

FIG. 7B

Sample ID : 20386
Cell concentration : 10000 cells / μL
Imaging cell number : 20000 cells Measurement in-progress Set  Change  Interrupt measurement 10  20 minutes
10000  20000 cells

FIG. 7C

Sample ID : 20386
Cell concentration : 10000 cells / μL
Imaging cell number : 20000 cells Set  Change  Interrupt measurement Interrupt measurement?  YES  NO 20 minutes
20000 cells

FIG. 7D

Sample ID : 20386
Cell concentration : 10000 cells / μL
Imaging cell number : 20000 cells Measurement interrupted

Sample ID : 20386
Cell concentration : 10000 cells / μL
Imaging cell number : 20000 cells Measurement complete

OK 10  20 minutes
10000  20000 cells

FIG. 7F

Sample ID : 20386
Cell concentration : 10000 cells / μL
Imaging cell number : 20000 cells Set  Change  Interrupt measurement Required time elapsed.
Continue measurement?  YES  NO 20
20000

FIG. 10A

| Order | Sample ID | Measurement item | Concentration /μL | Imaging number (cells) | Required time (min) | Selection |
|---|---|---|---|---|---|---|
| 1 | 20386 | BCR-ABL | 10000 | 10000 | 10 | ☐ |
| 2 | 14156 | BCR-ABL | 20000 | 10000 | 5 | ☐ |
| 3 | 235 | BCR-ABL | 10000 | 10000 | 10 | ☐ |
| 4 | 658 | PMA-RARA | 15000 | 10000 | 20 | ☐ |
| 5 | 5789 | BCR-ABL | 5000 | 10000 | 20 | ☐ |
| 6 | 12159 | PMA-RARA | 30000 | 10000 | 10 | ☐ |
|  |  |  |  |  |  | ☐ |
|  |  |  |  |  |  | ☐ |
|  |  |  |  |  |  | ☐ |
|  |  |  |  |  |  | ☐ |

[Set] [Change]
[Start] [Interrupt]
[Replace]

Start measurement?  [YES] [NO]

FIG. 10B

| Order | Sample ID | Measurement item | Concentration /μL | Imaging number (cells) | Required time (min) | Selection |
|---|---|---|---|---|---|---|
| 1 | 20386 | BCR-ABL | 10000 | 20000 | 20 | ☑ |
| — | 14156 | BCR-ABL | 20000 | 10000 | 5 | ☐ |
| 3 | 235 | BCR-ABL | 10000 | 5000 | 5 | ☑ |
| 4 | 658 | PMA-RARA | 15000 | 10000 | 20 | ☑ |
| — | 5789 | BCR-ABL | 5000 | 10000 | 20 | ☐ |
| 6 | 12159 | PMA-RARA | 30000 | 10000 | 10 | ☑ |
|  |  |  |  |  |  | ☐ |
|  |  |  |  |  |  | ☐ |
|  |  |  |  |  |  | ☐ |
|  |  |  |  |  |  | ☐ |

[Set] [Change]
[Start] [Interrupt]
[Replace]

Measurement started?  [YES] [NO]

FIG. 11A

| Order | Sample ID | Measurement item | Concentration /μL | Imaging number (cells) | Required time (min) | Selection |
|---|---|---|---|---|---|---|
| 1 | 20386 | BCR-ABL | 10000 | 20000 | 20 | ☑ |
| 2 | 235 | BCR-ABL | 10000 | 5000 | 5 | ☑ |
| 3 | 658 | PMA-RARA | 15000 | 10000 | 20 | ☑ |
| 4 | 12159 | PMA-RARA | 30000 | 10000 | 10 | ☑ |
| — | 14156 | BCR-ABL | 20000 | 10000 | 5 | ☐ |
| — | 5789 | BCR-ABL | 5000 | 10000 | 20 | ☐ |
|  |  |  |  |  |  | ☐ |
|  |  |  |  |  |  | ☐ |
|  |  |  |  |  |  | ☐ |
|  |  |  |  |  |  | ☐ |

[Set] [Change]   Sample ID: 20386
[Start] [Interrupt]
[Replace]          Measurement started?  [YES] [NO]

FIG. 11B

| Order | Sample ID | Measurement item | Concentration /μL | Imaging number (cells) | Required time (min) | Selection |
|---|---|---|---|---|---|---|
| 1 | 20386 | BCR-ABL | 10000 | 20000 | 20 | ☑ |
| 2 | 235 | BCR-ABL | 10000 | 5000 | 5 | ☑ |
| 3 | 658 | PMA-RARA | 15000 | 10000 | 20 | ☑ |
| 4 | 12159 | PMA-RARA | 30000 | 10000 | 10 | ☑ |
| — | 14156 | BCR-ABL | 20000 | 10000 | 5 | ☐ |
| — | 5789 | BCR-ABL | 5000 | 10000 | 20 | ☐ |
|  |  |  |  |  |  | ☐ |
|  |  |  |  |  |  | ☐ |
|  |  |  |  |  |  | ☐ |
|  |  |  |  |  |  | ☐ |

[Set] [Change]   Sample ID: 20386
[Start] [Interrupt]     Measurement in-progress
[Replace]
                0          10          20 minutes
                0         10000       20000 cells

FIG. 13A

| Order | Sample ID | Measurement item | Concentration /μL | Imaging number (cells) | Required time (min) | Selection |
|---|---|---|---|---|---|---|
| 1 | 20386 | BCR-ABR | 10000 | 20000 | 20 | ☑* |
| 2 | 235 | BCR-ABR | 10000 | 5000 | 5 | ☑ |
| 3 | 658 | PMA-RARA | 15000 | 10000 | 20 | ☑ |
| 4 | 12159 | PMA-RARA | 30000 | 10000 | 10 | ☑ |
| — | 14156 | BCR-ABR | 20000 | 10000 | 5 | ☐ |
| — | 5789 | BCR-ABR | 5000 | 10000 | 20 | ☐ |
|  |  |  |  |  |  | ☐ |
|  |  |  |  |  |  | ☐ |
|  |  |  |  |  |  | ☐ |
|  |  |  |  |  |  | ☐ |

[Set] [Change]  Sample ID: 20386
[Start] [Interrupt]  Measurement interrupted  [OK]
[Replace]

FIG. 13B

| Order | Sample ID | Measurement item | Concentration /μL | Imaging number (cells) | Required time (min) | Selection |
|---|---|---|---|---|---|---|
| 1 | 20386 | BCR-ABR | 10000 | 20000 | 20 | ☑ |
| 2 | 235 | BCR-ABR | 10000 | 5000 | 5 | ☑ |
| 3 | 658 | PMA-RARA | 10000 | 10000 | 15 | ☑ |
| 4 | 12159 | PMA-RARA | 30000 | 10000 | 10 | ☑ |
| — | 14156 | BCR-ABR | 20000 | 10000 | 5 | ☐ |
| — | 5789 | BCR-ABR | 5000 | 10000 | 20 | ☐ |
|  |  |  |  |  |  | ☐ |
|  |  |  |  |  |  | ☐ |
|  |  |  |  |  |  | ☐ |
|  |  |  |  |  |  | ☐ |

[Set] [Change]  Sample ID: 20386
[Start] [Interrupt]  Measurement complete  [OK]
[Replace]

SAMPLE PROCESSING APPARATUS, SAMPLE PROCESSING SYSTEM, AND MEASUREMENT TIME CALCULATION METHOD

RELATED APPLICATIONS

This application claims priority from prior Japanese Patent Application No. 2017-154782, filed on Aug. 9, 2017, entitled "Sample Processing Apparatus, Sample Processing System, and Measurement Time Calculation Method", the entire contents of which are incorporated herein by reference.

BACKGROUND OF THE INVENTION

1. Field of the Invention

The present invention relates to a sample processing apparatus, a sample processing system, and a method of calculating measurement time.

2. Description of the Related Art

Japanese Patent Application No. 2007-304044 describes a particle image analyzer 1 capable of analyzing a captured particle image to obtain morphological feature information. As shown in the block diagram of FIG. 16, the particle image analyzer 1 is electrically connected to an image data analyzer 2 using the electric signal line 300. The particle image analyzer 1 includes a fluid mechanism 3 that forms a flow of a particle suspension, an illumination optical system 4 that irradiates light to the flow of the particle suspension, an imaging optical system 5 that captures an image of the flow of the particle suspension, an image processing printed circuit board 6 for performing processing such as extracting a partial image (particle image) from an image captured by the imaging optical system 5, and a CPU printed circuit board 7 for controlling the particle image processing apparatus 1.

SUMMARY OF THE INVENTION

In the particle image analyzer 1 and the like described in Japanese Patent Application No. 2007-304044, for example, a measurement can be continued until imaging of a predetermined number of particles is completed. In imaging with such a method, the following can occur.

When a predetermined number of cells are required to detect certain abnormal cells, there are two measurement samples with different cell concentrations. Measurement time is longer for measurement samples with lower concentrations. This is because a measurement sample having a low cell concentration has a smaller number of cells per 1 µL than the other measurement sample, so that a large amount of measurement sample is poured into the apparatus until the target imaging number is reached, and the cells are imaged. The time required for measuring a measurement sample having a low concentration of cells is therefore longer than the measurement time for measuring a measurement sample having a high concentration of cells. As described above, even in the case of imaging the same predetermined number of cells, the time required for imaging depends on the concentration, which may vary widely from several minutes to several hours, for example. Therefore, when imaging the cells of the same measurement target as in the previous time, the operator may perform the measurement while anticipating that the time required for imaging is the same time as the time of the previous measurement. However, when the concentrations of the measurement samples are different, as described above, there is a difference in time required for imaging. In this case, it is difficult for the operator to determine whether it takes time because of a malfunction of the device or whether it is properly measured.

The following problems also arise in terms of variations in cell concentration. There are individual differences in the number of cells contained in the sample collected from a subject. For example, the number of white blood cells in the blood varies from 3500 to 9800/pt even among healthy persons. Depending on the disease, the numerical value of white blood cells also increases and decreases greatly. The concentration of the cells contained in the measurement sample therefore varies markedly depending on the individual differences and the condition of the disease. As described above, the time required for imaging a predetermined number of cells may vary for each measurement sample. When imaging of a measurement sample requiring a long time for imaging is started, it is necessary to wait for a long time before processing other measurement samples, and processing of the entire measurement sample may be inefficient.

In view of such problems, the present invention provides a sample processing apparatus, a sample processing system, and a method of calculating measurement time, which allow an operator to efficiently capture images of cells.

A first aspect of the invention relates to a sample processing apparatus (10). A sample processing apparatus (10) according to this aspect includes light sources (121 to 124) for irradiating light to a measurement sample (22), an imaging unit (154) for capturing an image of cells in the measurement sample (22), and a processing unit (11) for calculating a time required for cell imaging based on the cell concentration information of the cells contained in the measurement sample (22).

According to the sample processing apparatus of this aspect, since the operator can acquire the time required for processing the measurement sample, the required time is recognized as a time suitable for the measurement and the cell imaging operation can proceed stably even if the elapsed time after the start of the imaging operation becomes lengthy. The operator also can determine the order of priority of processing for the measurement samples by acquiring the required time before the start of the imaging operation. Thus, the operator can proceed efficiently on a series of measurement samples.

Note that "cell concentration information" includes the number of cells contained in a fixed amount of measurement sample and the concentration of cells contained in the measurement sample.

In the sample processing apparatus (10) according to this aspect, the required time includes the time required for processing the image captured by the imaging unit (154), and the time required for the analysis of the image processed by the imaging unit (154). In this way the operator can appropriately acquire the time necessary for processing the measurement sample.

The sample processing apparatus (10) according to this aspect may include a display unit (13) for displaying information. In this case, the processing unit (11) displays the calculated required time on the display unit (13).

In the sample processing apparatus (10) according to this aspect, the processing unit (11) may be configured to accept a selection of whether measurement of the measurement sample (22) is executed. In this way the operator can select whether to measure the measurement sample, that is, whether to capture the cell image. Here, "measurement" includes imaging of a cell image by the imaging unit.

In this case, the processing unit (11) displays on the display unit (13) a screen including a button for accepting a selection of whether measurement of the measurement sample (22) is to be executed and a required time. In this way the operator can select whether to actually measure the measurement sample after comprehending the required time. For example, when the required time is a long time, the operator may not immediately execute measurement of the measurement sample but can schedule it to execute later.

In the sample processing apparatus (10) according to this aspect, the processing unit (11) may be further configured to cause the display unit (13) to display cell concentration information. In this way the operator can visually grasp the concentration information of the cells.

In the sample processing apparatus (10) according to this aspect, the processing unit (11) may be configured to display information on the measurement progress of the measurement sample (22) on the display unit (13). In this way the operator can grasp that the imaging operation is continuing, and can determine whether a malfunction has occurred in the apparatus.

In this case, the information on the progress may include information on the elapsed time from the moment the processing unit (11) starts measuring the measurement sample (22) to the present time. In this way, the operator can comprehend the time required for the measurement at the present time, and roughly grasp the time until the imaging operation ends.

The information on the progress also may include information on the number of cell images captured by the imaging unit (154) from the time when the processing unit (11) starts measuring the measurement sample (22) to the present time. In this way the operator can visually grasp the number of the imaged cells and adopt a countermeasure such as interrupting imaging when a sufficient number of cells are imaged.

In this case, the processing unit (11) may be configured to execute processing for accepting interruption of processing. In this way the operator can interrupt the imaging operation as appropriate while confirming the progress status of imaging.

In this case, the processing unit (11) may be configured to cause the display unit (13) to display a screen including information on the progress and a button for accepting the interruption of processing. In this way the operator can smoothly interrupt the imaging operation while confirming the progress status of imaging.

In the sample processing apparatus (10) according to this aspect, the processing unit (11) is configured to accept a selection of whether to interrupt the measurement of a measurement sample (22) based on the fact that the elapsed time from the start of measurement of the measurement sample (22) to the present time exceeds the required time. In this way the operator can determine whether the imaging operation should be continued further when the initially assumed required time is exceeded, and can interrupt the subsequent imaging operation as necessary. If the required time has already elapsed, but the measurement has not yet been completed, the operator also can examine the possibility of a malfunction in the sample processing apparatus. In such a case, the operator can appropriately interrupt the measurement and check the state of the sample processing apparatus. Note that the phrase "exceeding the required time" includes a case in which a required time has elapsed, and a case in which a time obtained by adding a predetermined excess time to the required time has elapsed.

In this case, the processing unit (11) is configured to display a screen including a button for accepting a selection of whether to stop measurement of the measurement sample (22) and information on the number of cell images captured up to the present time to be displayed on the display unit (13). In this way the operator can smoothly interrupt the imaging operation when the number of already captured cell images is sufficient.

In the sample processing apparatus (10) according to this aspect, the processing unit (11) is configured to calculate the required time to capture images of a changed number of cells when executing a process to accept a change n the number of cells to be imaged and the changed number of cells to be imaged is accepted. In this way the operator can reduce the required time by appropriately decreasing the number of cells to be measured when the required time is longer than expected. Conversely, when careful measurement is desired based on the medical condition or the like of the patient, the operator can appropriately increase the number of cells to be imaged while taking the required time into consideration.

In the sample processing apparatus (10) according to this aspect, before measuring and analyzing the measurement sample (22), the processing unit (11) is configured to acquire cell concentration information by measuring a predetermined amount of the measurement sample (22) before measuring and analyzing the measurement sample (22). In this way the accuracy and reliability of the time required for imaging a predetermined number of cells can be enhanced by acquiring the cell concentration of the measurement sample itself to be used for imaging.

A sample processing apparatus (10) according to this aspect includes a communication unit (40) capable of communicating with an external device (30). The processing unit (11) may be configured to acquire cell concentration information based on information acquired from the external device (30) via the communication unit (40). In addition to the information on cell concentration, the external device not only aggregates various kinds of information on the sample, but also transmits information acquisition requests from various devices related to cell detection. Thus, if the sample processing apparatus sends a cell concentration information acquisition request to the external device via the communication unit, the cell concentration desired by the operator is transmitted from the external device to the sample processing apparatus. Since it is possible to communicate with an external device, it also is unnecessary to perform processing to acquire the concentration in the sample processing apparatus, and the processing in the sample processing apparatus can be simplified.

In this case, the processing unit (11) is configured to acquire cell concentration information relating to a sample (21) before the pretreatment for preparation of the measurement sample (22) from the external device (30) via the communication unit (40), and acquire concentration information of the cells relative to the measurement sample (22) by performing correction based on preprocessing on the acquired information. Generally, pretreatment reduces cells in the sample. Therefore, the accuracy of the concentration of the cells in the measurement sample can be improved by correcting based on the pretreatment as described above.

The external device (30) is a host computer that manages the measurement results of the measuring device that measures the sample (21) before performing the pretreatment.

In the sample processing apparatus (10) according to this aspect, the processing unit (11) may be configured to receive input of cell concentration information. In this way the operator can input and set the concentration of the cells in the measurement sample directly to the sample processing apparatus.

In the sample processing apparatus (10) according to this aspect, the cell to be imaged can be a nucleated cell.

In this case, the nucleated cells may be leukocytes.

The sample processing apparatus (10) according to this aspect includes a flow cell through which a measurement sample (22) flows, such that the light sources (121 to 124) irradiate light onto the measurement sample (22) flowing through the flow cell (110) and the imaging unit (154) is configured to capture images of the light given off from the measurement sample (22) flowing through the flow cell (110). In this way high-quality cell images can be imaged and abnormal cells can be accurately detected.

A sample processing apparatus (10) according to this aspect is provided with a display unit (13) for displaying information. The processing unit (11) is configured to calculate the required time for each measurement sample (22) based on the cell concentration information of the cells contained in a plurality of measurement samples (22), and displays a screen including a list of the calculated required time and the identification information of each measurement sample on the display unit (13). In this way it is possible to provide the operator with the required time for capturing cell images for a plurality of measurement samples.

In this case, the processing unit (11) may be configured to include on the screen including the list an item for accepting a selection of whether to perform measurement on each measurement sample (22). In this way the operator can compare the required time of each measurement sample and select which measurement sample is to be measured.

The processing unit (11) also may be configured to calculate the required time for capturing cell images for a plurality of cells after the change, and displaying the list of recalculated required times on the display unit (13) when the screen including the list also includes an item for accepting a change of the number of captures of cell images of each measurement sample (22) and the change of the number of image captures is accepted. In this way the operator can adjust the number of images to be taken of each measurement sample as appropriate while referring to the required time of the other measurement samples. In this way the operator can proceed with the measurement efficiently for all measurement samples included in the list.

In the sample processing apparatus (10) according to this aspect, the processing unit (11) may be configured to execute a process of accepting a change in processing order of the measurement samples (22) on a screen including the list. In this way the operator can change the measurement order as appropriate for the plurality of measurement samples while taking into account urgency and the efficiency. Note that the order of priority may be determined by the operator based on the order of acquisition of captured images, the length of required time, and the like.

A second aspect of the present invention relates to a sample processing system (70). A sample processing system (70) according to this aspect includes a sample processing apparatus (10) according to the first aspect and a cell counting apparatus (50) for counting cells contained in the sample. The processing unit (11) of the sample processing apparatus (10) acquires the cell count value from the cell counting apparatus (50) and acquires cell concentration information. In this way the cell concentration is separately measured by the cell counting apparatus and cell images can be taken based on the measurement result, hence, measurement efficiency is improved.

The sample processing system (70) according to this aspect also includes a pretreatment device (20) for preparing the measurement sample (22) in the pretreatment, and the processing unit (11) of the sample processing apparatus (10) acquires information related to the content of pretreatment, corrects the count value of the cell counting apparatus (50) based on the content of the pretreatment to acquire cell concentration information. Generally, pretreatment reduces cells in the sample. Therefore, the accuracy of the concentration of the cells in the measurement sample can be improved by correcting based on the pretreatment as described above.

A third aspect of the present invention relates to a method of calculating a measurement time of a measurement sample including cells. The method of calculating the measurement time of this aspect includes a step (S12) of acquiring information on the concentration of cells contained in the measurement sample (22), and a step (S23) of calculating the time required for cell imaging based on the acquired cell concentration information.

The same effect as in the first aspect can be obtained according to the method of calculating measurement time of this aspect.

In the method of calculating the measurement time according to this aspect, in the step of calculating the required time, the time required for processing (S15) of the captured image of the cells in the measurement sample (22) is calculated, and the time required for the analysis (S16) of the captured image of the cells in the measurement sample is calculated. In this way the operator can appropriately acquire the time necessary for processing the measurement sample.

The method of calculating the measurement time according to this aspect also includes a step (S24) of displaying the calculated required time. In this way the operator can easily comprehend the required time.

In this case, in the step (S24) of displaying the required time, a selection instruction of whether the measurement of the measurement sample (22) is to be executed is accepted, and the measurement is executed when a selection instruction to execute measurement of the measurement sample is accepted (S25). In this way the operator can select whether to execute the measurement after comprehending the required time. Therefore, measurement can be performed smoothly.

In the method of calculating the measurement time according to this aspect, when a change in the number of cells to be imaged is accepted (S22), then in the step of displaying the required time (S24), the time required to capture images of the changed number of cells to be imaged is calculated and the calculated required time is displayed (S24). In this way the operator can adjust the required time appropriately by decreasing or increasing the number of cells to be measured.

In the method of calculating the measurement time according to this aspect, the concentration information of the cells is also displayed in the step of displaying the required time (S24). In this way the operator can perform measurements while grasping the concentration information of the cells.

In the method of calculating the measurement time according to this aspect, the concentration information of the cells contained in the plurality of measurement samples (22) is acquired (S11) in the step of acquiring cell concentration information (S12), and the required time of each measurement sample (22) is calculated (S21) based on the concentration information of a plurality of cells in step (S21) for calculating the required time, and a screen including a list of required times associated with the identification information of each measurement sample (22) is displayed in the step (S23) for displaying required time. In this way the operator can grasp the time required for capturing cell images for a plurality of measurement samples.

In the method of calculating the measurement time according to this aspect, in the step of executing the measurement (S25), information on the progress of the measurement of the measurement sample is displayed (S24). In this way the operator can smoothly perform the imaging operation while confirming the progress status of the imaging.

In the measurement time calculation method according to this aspect, in the step of acquiring cell concentration information, measurement is performed for acquiring cell concentration information on part of the measurement sample (22) (S12), and in the step of executing the measurement (S25), measurements for imaging and analysis are performed on the remaining portion of the same measurement sample (S13). In this way a sufficient amount of sample can be ensured when conducting the measurement.

In the method of calculating the measurement time according to this aspect, in the step of acquiring cell concentration information (S52), cell concentration information is acquired by communication. Input of cell concentration information is accepted, and input information is acquired as cell concentration information. In this way the operator can manually input and set the concentration of cells into the sample processing apparatus.

According to the present invention, operator convenience can be improved and an efficient examination can be provided by acquiring concentration information of cells contained in a measurement sample and calculating the time required for capturing a cell image.

BRIEF DESCRIPTION OF THE DRAWINGS

FIGS. 3A to 3D are diagrams schematically showing arrangement examples of bright spots of a negative pattern, a positive pattern 1, a positive pattern 2, and a positive pattern 3 of the embodiment, respectively;

FIGS. 7A to 7F are diagrams describing a display screen according to the first embodiment;

FIG. 8 is a diagram describing a first modification of the first embodiment.

FIGS. 10A and 10B are diagrams describing a display screen according to the second modification of the first embodiment;

FIGS. 11A and 11B are diagrams describing a display screen according to the second modification of the first embodiment;

FIGS. 13A and 13B are diagrams describing a display screen according to the second modification of the first embodiment;

DETAILED DESCRIPTION OF THE PREFERRED EMBODIMENTS

Specifically, in the following embodiments, the target site in the nucleic acid is the BCR gene on chromosome 22 and the ABL gene on chromosome 9, and chromosome 22 and chromosome 9 found in chronic myelogenous leukemia are detected as abnormal cells based on the FISH method. That is, in the following embodiments, a cell in which a BCR gene or ABL gene is translocated to produce a BCR-ABL fusion gene is detected as an abnormal cell. In the following embodiments, the cells to be detected are white blood cells in a blood sample.

Apparatus Structure

Figure 1:
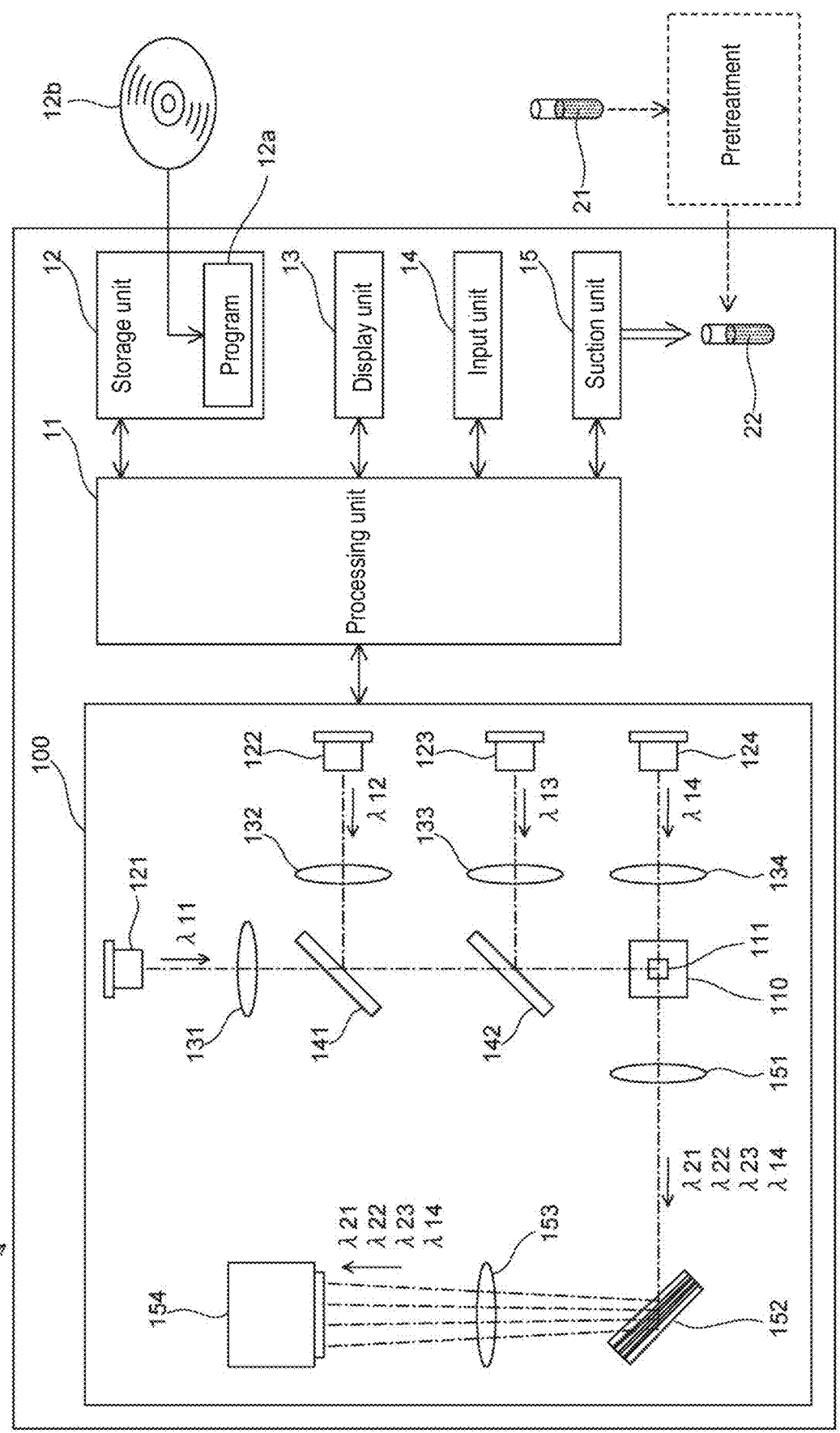
FIG. 1 is a brief structural diagram of a sample processing apparatus according to a first embodiment.

As shown in FIG. 1, the sample processing apparatus 10 measures and analyzes a measurement sample 22 prepared by pretreatment of a sample 21 by an operator. Here, in this embodiment, the sample to be used for capturing a cell image is referred to as "measurement sample". In contrast, a sample before being used for imaging, that is, a sample collected from a subject and before pretreatment is performed, is referred to as "sample". The same applies to the following description. The operator pretreats the blood sample collected from the subject, that is, the sample 21 to be used for imaging the cell image, and prepares the measurement sample 22.

The pretreatment includes a plurality of steps. The operator performs treatment such as centrifugal separation on the sample 21, then mixes it with a reagent, and performs treatment such as heating. In addition, the operator prepares the measurement sample 22 by performing the step of labeling the target site of the detection target cell contained in the sample 21 with a fluorescent dye, and the step of specifically staining the nucleus of the cell with a dye for nuclear staining.

Specifically, in the step of labeling the target site with a fluorescent dye, a nucleic acid probe labeled with a fluorescent dye and the target site in the nucleic acid are hybridized. The nucleic acid probe that hybridizes with the BCR gene is labeled with a first fluorescent dye that produces fluorescence with a wavelength of $\lambda21$ upon irradiation with excitation light of wavelength $\lambda11$. In this way the BCR gene is labeled with the first fluorescent dye. The nucleic acid probe which hybridizes with the ABL gene is labeled with a second fluorescent dye which produces fluorescence of wavelength $\lambda22$ by irradiation with excitation light of wavelength $\lambda12$. In this way the ABL gene is labeled with the second fluorescent dye. The nucleus is dyed with a dye for nuclear staining which produces fluorescence of wavelength $\lambda23$ by irradiation with excitation light of wavelength $\lambda13$.

More specifically, the pretreatment includes a treatment in which the cells are immobilized by dehydration so that the cells do not contract, a membrane permeability treatment in which cells are sized to be able to introduce a nucleic acid probe into the cells, a heat denaturation treatment of heating the cell, a treatment of hybridization of the target site with the nucleic acid probe, a washing treatment for removing unnecessary nucleic acid probe from the cell, and a treatment for staining the nucleus.

The operator dispenses the measurement sample 22 prepared by the pretreatment into a container prepared in advance in the sample processing apparatus 10. In this way processing on the measurement sample 22 is executed in the sample processing apparatus 10.

The sample processing apparatus 10 includes an imaging unit 100, a processing unit 11, a storage unit 12, a display unit 13, an input unit 14, and a suction unit 15. The imaging unit 100 includes a flow cell 110, light sources 121 to 124, condenser lenses 131 to 134, dichroic mirrors 141 and 142, a condenser lens 151, an optical unit 152, a condenser lens 153, an imaging part 154. The measurement sample 22 is flowed in the flow channel 111 of the flow cell 110.

The light sources 121 to 124 irradiate the measurement sample 22 flowing through the flow cell 110 with light. The light sources 121 to 124 are configured by a semiconductor laser light source. The light emitted from the light sources 121 to 124 are laser beams having wavelengths $\lambda11$ to $\lambda14$, respectively. The condenser lenses 131 to 134 collect the light emitted from the light sources 121 to 124, respectively. The dichroic mirror 141 transmits light of wavelength $\lambda11$ and reflects light of wavelength $\lambda12$. The dichroic mirror 142 transmits light of wavelengths $\lambda11$ and $\lambda12$, and reflects light of wavelength $\lambda13$. In this way light of wavelengths $\lambda11$ to $\lambda14$ is irradiated onto the measurement sample 22 flowing through the flow channel 111 of the flow cell 110.

When the sample flowing through the flow cell 110 is irradiated with light having wavelengths $\lambda11$ to $\lambda13$, fluorescence is generated from the fluorescent dye staining the cells. Specifically, when the light of the wavelength $\lambda11$ is irradiated to the first fluorescent dye that labels the BCR gene, fluorescence of the wavelength $\lambda21$ is generated from the first fluorescent dye. When light of the wavelength $\lambda12$ is irradiated to the second fluorescent dye which labels the ABL gene, fluorescence of the wavelength $\lambda22$ is generated from the second fluorescent dye. When light having a wavelength $\lambda13$ is irradiated to a dye for nuclear staining which stains nuclei, fluorescence having a wavelength $\lambda23$ is generated from the dye for nuclear staining. When the sample flowing through the flow cell 110 is irradiated with light having a wavelength $\lambda14$, this light transmits through the cell. The wavelength $\lambda14$ that passes through the cell is used to generate a bright field image. In the embodiment, wavelength $\lambda21$ is a wavelength band of green light, wavelength $\lambda22$ is a wavelength band of red light, and wavelength $\lambda23$ is a wavelength band of blue light.

The condenser lens 151 condenses the fluorescent light of wavelengths $\lambda21$ to $\lambda23$ generated from the measurement sample 22 flowing through the flow channel 111 of the flow cell 110 as well as the light of wavelength $\lambda14$ transmitted through the measurement sample 22 flowing through the flow channel 110 of the flow cell 110. The optical unit 152 has a configuration in which four dichroic mirrors are combined. The four dichroic mirrors of the optical unit 152 reflect the fluorescent light of the wavelengths $\lambda21$ to $\lambda23$ and the light of the wavelength $\lambda14$ at slightly different angles from each other and separate them on the light receiving surface of the imaging unit 154. The condensing lens 153 collects the fluorescent light of the wavelengths $\lambda21$ to $\lambda23$ and the light of the wavelength $\lambda14$.

The imaging unit 154 is configured by a TDI (Time Delay Integration) camera. The imaging unit 154 captures the fluorescence of the wavelengths $\lambda21$ to $\lambda23$ and the light of the wavelength $\lambda14$ and captures the fluorescent image corresponding to the fluorescence of the wavelengths $\lambda21$ to $\lambda23$ and the bright field image corresponding to the light of the wavelength $\lambda14$, and outputs the fluorescence as a signal. Fluorescent images corresponding to fluorescence of wavelengths $\lambda21$ to $\lambda23$ are hereinafter referred to as "first image", "second image", and "third image", respectively.

Figure 2A:
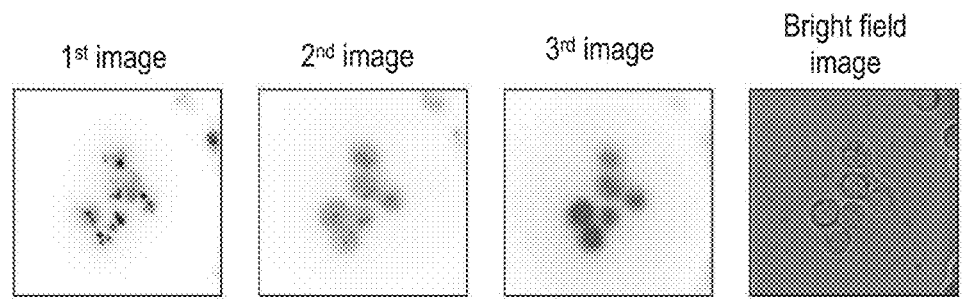
FIG. 2A is a diagram illustrating first to third images and bright field images acquired by the sample processing apparatus of the embodiment.

In the example of FIG. 2A, the bright spots of the fluorescent light of the wavelength $\lambda21$ are distributed as dots in black in the first image and, although it is somewhat thinner than in the case of the first image, the bright spots of the fluorescent light of wavelength $\lambda22$ are distributed as dots in black in the second image. In the third image, the nuclear region is distributed in black. In the bright field image, the state of the actual cell can be confirmed. Note that each image in FIG. 2A is an image showing, as an example, a white blood cell after pretreatment placed on a slide glass and observed with a microscope, and the first to third images in FIG. 2A are obtained by inverting the gradation and then changing the color tone to gray. When the measurement sample 22 flowing through the flow cell 110 is imaged by the imaging unit 154 as described above, the fluorescent image and the bright field image are acquired for each cell because the cells flow through the flow channel 111 in a state of being separated from each other.

Returning to FIG. 1, the processing unit 11 is configured by a CPU. The processing unit 11 also may be configured by a CPU and a microcomputer. The processing unit 11 performs various processes based on the program 12a stored in the storage unit 12. The processing described later with reference to the flowchart is performed by the processing unit 11 executing the program 12a. The program 12a is not limited to being stored in advance in the storage unit 12 and may be copied or installed from a recording medium 12b via a reading device (not shown) provided in the sample processing apparatus 10. The recording medium 12b is configured by, for example, an optical disk such as a CD-ROM. The program 12a also may be copied or installed from another computer via a communication cable or the like.

The processing unit 11 is connected to the imaging unit 100, the storage unit 12, the display unit 13, and the input unit 14, receives signals from each unit, and controls each unit. The storage unit 12 is configured by a RAM, a ROM, a hard disk, and the like. The display unit 13 is configured by a display. The input unit 14 includes a mouse and a keyboard. The suction unit 15 suctions the measurement sample 22 from the container that accommodates the measurement sample 22, and discharges the suctioned sample into the flow cell 110 of the imaging unit 100.

The processing unit 11 processes the first to third images captured by the imaging unit 154. Specifically, the processing unit 11 extracts the bright spots of the fluorescence of wavelength λ21 from the first image based on the fluorescence of wavelength λ21, and extracts the bright spots of the fluorescence of wavelength λ22 from the second image based on the fluorescence of wavelength λ22. The processing unit 11 also extracts the nucleus range from the third image based on the fluorescence of wavelength λ23.

The processing unit 11 determines whether the BCR gene or the ABL gene is an abnormal cell that is translocated for each cell based on the distribution status of the bright spots in the first image and the second image so as to detect abnormal cells. The determination of abnormal cells will be described later with reference to FIGS. 3A to 3D.

Next, the extraction of the nucleus region and the extraction of the bright spot region performed by the sample processing apparatus 10 will be described.

Figure 2B:
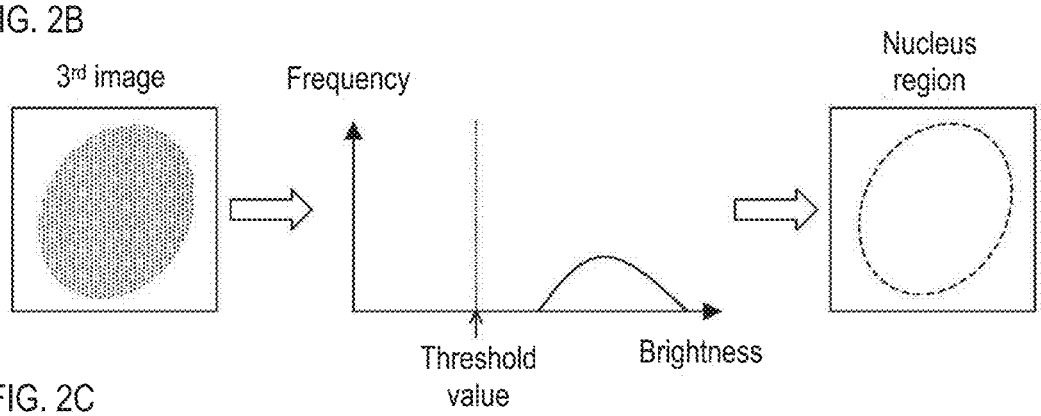
FIG. 2B is a diagram describing the extraction of the nucleus region performed by the sample processing apparatus of the embodiment.
Figure 2C:
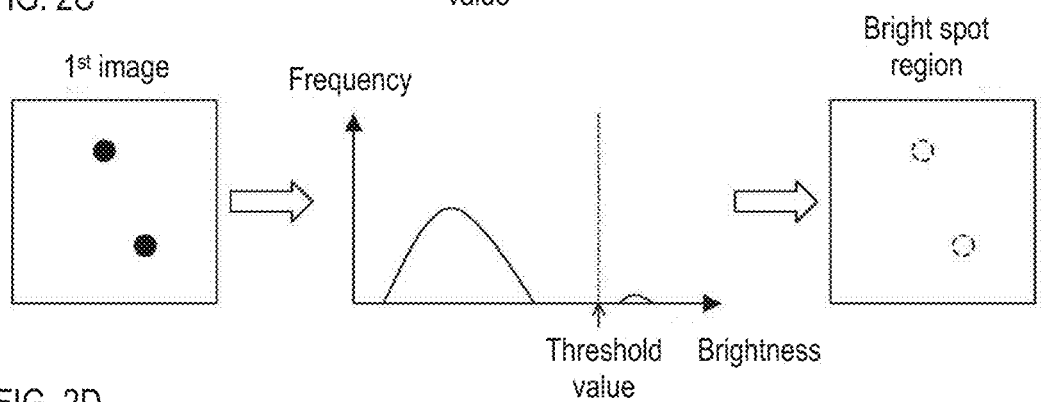
FIGS. 2C and 2D are diagrams describing the extraction of a bright spot region to be performed by the sample processing apparatus of the embodiment.
Figure 2D:
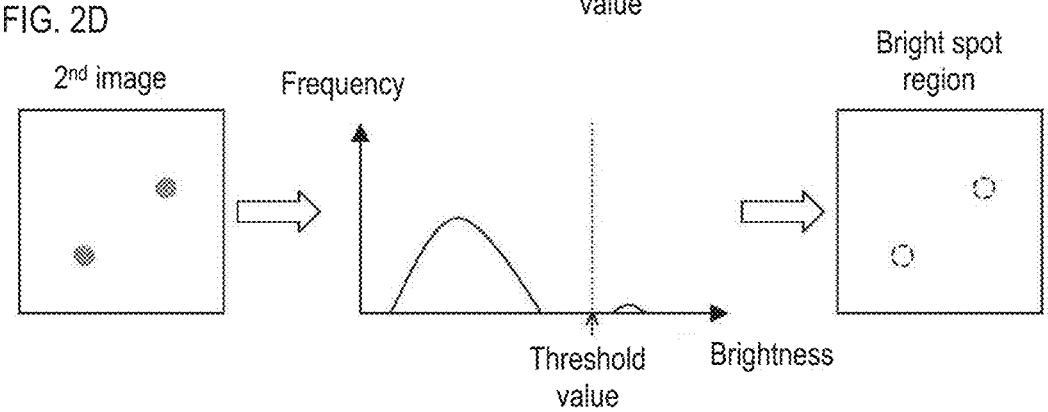

The third image shown at the left end of FIG. 2B, the first image shown at the left end of FIG. 2C, and the second image shown at the left end of FIG. 2D are images of the measurement sample 22 flowing through the flow cell 110 acquired from the same area.

When the third image is acquired as shown at the left end of FIG. 2B, the processing unit 11 calculates the luminance of each pixel on the third image as shown in the center of FIG. 2B, and creates a graph of brightness and frequency. The frequency of the vertical axis indicates the number of pixels. The processing unit 11 sets a luminance threshold value in this graph. Then, the processing unit 11 extracts a range in which pixels having luminance greater than the threshold value are distributed as a nucleus area as indicated by a broken line at the right end of FIG. 2B.

As shown at the left end of FIG. 2C, when the first image is acquired, the processing unit 11 calculates the luminance as shown in the center of FIG. 2C based on the luminance at each pixel on the first image, and creates a graph of brightness and frequency. In this graph, the processing unit 11 sets a luminance threshold as a boundary between the bright spots and the background based on the Otsu method, for example. Then, the processing unit 11 extracts a range in which pixels having a luminance greater than the threshold value are distributed as a region of a bright spots as indicated by a broken line at the right end of FIG. 2C. Note that when a region of bright spots is extracted from the first image, a bright spot having an extremely small region, a bright spot having an extremely large region, and a bright spot not included in nucleus region shown at the right end of FIG. 2B are excluded.

As shown in the left end of FIG. 2D, when the second image is acquired, as in the case of the first image, the processing unit 11 calculates the luminance of each pixel on the second image as shown in the center of FIG. 2D, and creates a graph of brightness and frequency. In this graph, the processing unit 11 sets a threshold of luminance and extracts a range where pixels having luminance larger than the threshold are distributed as a region of bright spots as indicated by a broken line at the right end of FIG. 2D. When a region of a bright spots is extracted from the second image, a bright spot having an extremely small region, a bright spot having an extremely large region, and a bright spot not included in the nucleus region shown at the right end of FIG. 2B are excluded.

Note that the processing unit 11 extracts a nuclear region from the third image according to the procedure described above without generating a graph as shown in the middle of FIGS. 2B to 2D, and extracts the region of the bright spots from the first image and the second image bright spots. The extraction of bright spots is performed by determining the degree of matching between the distribution waveform of the normal bright spot and the region of the determination target, and extracts the region of the determination target as a bright spot when the degree of matching is high. The processing unit 11 detects the cells by extracting the nucleus region from the third image, but also may detect the cells based on the bright field image. In the case where cells are detected based on the bright field image, the acquisition of the third image can be omitted. The bright spot in the present embodiment means a point of small fluorescence generated in the fluorescence image. More specifically, a bright spot means a point of fluorescence obtained from a fluorescent dye of a nucleic acid probe bound to a gene as a target site in the nucleus.

Next, referring to FIGS. 3A to 3D, determination of abnormal cells performed by the sample processing apparatus 10 will be described.

FIG. 3A shows an arrangement example of the bright spots of the negative pattern, and FIGS. 3B to 3D show arrangement examples of the bright spots of the positive patterns 1 to 3. Note that, in this embodiment, the arrangement pattern of the bright spots in the abnormal cell substantially matches any one of the positive patterns 1 to 3 shown in FIGS. 3B to 3D.

As shown in FIG. 3A, when no translocation occurs for the BCR gene and the ABL gene, there are two luminescent spots of fluorescence of wavelength λ21 in the first image, that is, green fluorescence in the nucleus, and there are two luminescent spots in the nucleus of fluorescence of wavelength λ22 in the second image, that is, red fluorescence. In this case, when the first image and the second image are synthesized, two green bright spots and two red bright spots exist in one nucleus in the composite image. When each bright spot exists as shown in FIG. 3A, the processing unit 11 determines that there is no translocation, namely negative, for the BCR gene and the ABL gene in this cell.

As shown in FIG. 3B, when a part of the ABL gene is transferred to chromosome 9 by translocation, there are two points of green fluorescent bright spots in the nucleus in the first image, and there are three red spots in the nucleus in the second image. In this case, when synthesizing the first image and the second image, one green bright spot, two red bright spots and one yellow bright spot exist in one nucleus in the composite image. When each bright spot exists as shown in FIG. 3B, the processing unit 11 determines that translocation occurs in the BCR gene and ABL gene of this cell, that is, it is positive.

As shown in FIG. 3C, when a part of the BCR gene transfers to chromosome 22 due to the translocation and a part of the ABL gene is transferred to chromosome 9, there are three green bright spots in the nucleus in the first image, and three points of red bright spots exist in the nucleus in the second image. In this case, when synthesizing the first image and the second image, one green bright spot, one red bright spot and two yellow bright spots exist in one nucleus in the composite image. When each bright spot exists as shown in FIG. 3C, the processing unit 11 determines that translocation occurs in the BCR gene and the ABL gene for this cell, that is, it is positive.

As shown in FIG. 3D, when the ABL gene is transferred to chromosome 9 by the translocation, there are two green bright spots in the nucleus in the first image, and there are two red bright spots in the nucleus in the second image. In this case, when the first image and the second image are synthesized, one green bright spot, one red bright spot and one yellow bright spot exist in one nucleus. When each bright spot exists as shown in FIG. 3D, the processing unit 11 determines that translocation occurs in the BCR gene and the ABL gene of this cell, that is, it is positive.

Next, in the sample processing apparatus 10, the calculation and display of the time required for capturing a predetermined number of cell images by the imaging unit 100 will be described in detail.

First Embodiment

First, with reference to FIGS. 1 to 4, processing which includes imaging of a cell image contained in a sample taken from a subject and analysis of a captured image by the sample processing apparatus 10 according to the first embodiment will be described. Note that the flowchart in FIG. 4 starts from the point where the operator starts pretreatment of a sample collected from the subject, that is, the sample 21.

Figure 4:
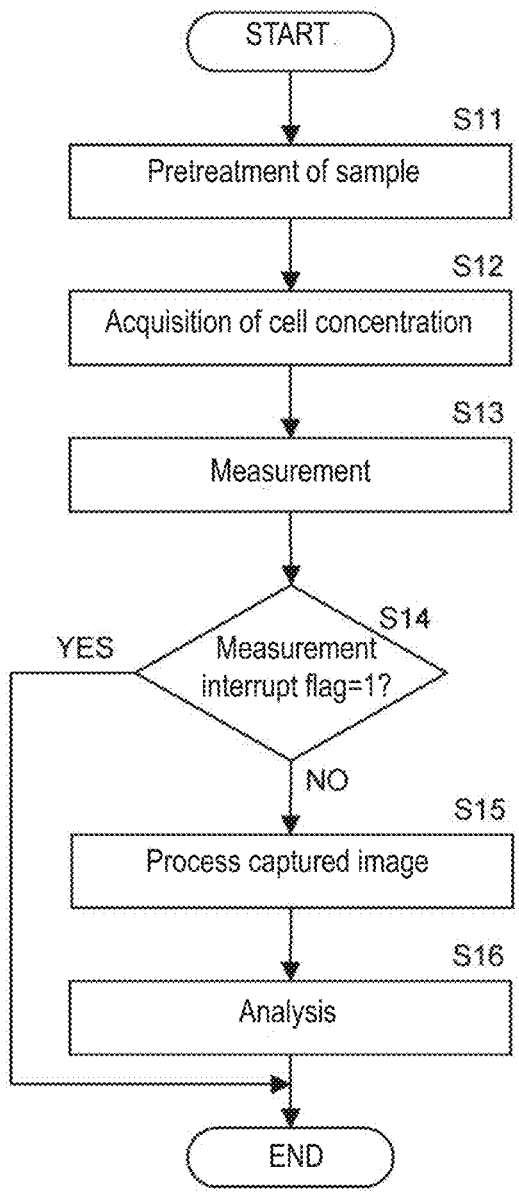
FIG. 4 is a flowchart illustrating measurement and analysis of a measurement sample by the sample processing apparatus of the first embodiment.

In step S11, the operator performs pretreatment of the sample 21 to prepare the measurement sample 22, as shown in FIG. 4. Step S11 includes a step of hybridizing a nucleic acid probe labeled with the fluorescent dye and the BCR region and the ABL region in the nucleic acid of the negative sample. The operator sets the container containing the pretreated measurement sample 22 in the sample processing apparatus 10.

In step S12, the suction unit 15 suctions the measurement sample 22 from the container and sends it to the processing unit 11. The processing unit 11 acquires the concentration information of the cells contained in the measurement sample 22, and stores the acquired cell concentration in the storage unit 12. Specifically, the processing unit 11 causes the predetermined amount of the measurement sample 22 suctioned by the suction unit 15 to flow through the flow cell 110, and obtains the number of cells contained in a predetermined amount of the measurement sample 22 based on the bright field image. Then, the processing unit 11 acquires, for example, the number of cells contained in 1 µL of the measurement sample 22 as the cell concentration information. Note that the acquisition of the cell concentration is not limited to acquisition based on the bright field image and also may be acquired based on the fluorescent image.

When a large amount of measurement sample 22 is consumed to acquire cell concentration information, the amount of measurement sample 22 remaining in the container is reduced, and there is a possibility that the target number of cell images cannot be acquired in the subsequent imaging processing. Therefore, in step S12, the suction amount of the measurement sample 22 is controlled to a small amount. In this way, the first suction is performed by the suction unit 15 in the stage of obtaining the cell concentration information.

Note that, in steps S21 and S23 of FIG. 5 described later, the processing unit 11 calculates the required time for cell imaging based on the cell concentration information acquired in step S12, and stores the calculated required time in the storage unit 12.

In step S13, the processing unit 11 measures the measurement sample 22 prepared by the pretreatment process in step S11. As described later with reference to FIG. 5, the measurement in step S13 is started by the operator operating the measurement start button. The measurement start button will be described later with reference to FIG. 7A.

When the measurement is started in step S13, the suction unit 15 suctions all the measurement sample 22 remaining in the container and sends it to the processing unit 11. In this way, in step S13, the second measurement sample 22 is suctioned by the suction unit 15 at the stage of imaging the cells. Note that when the total amount of the measurement sample 22 stored in the container is, for example, 100 ml before the processing of step S12 is performed, the suctioned amount of the measurement sample 22 suctioned from the container is set to about 10 ml in step S12. The remaining 90 ml of the measurement sample 22 is suctioned from the container and supplied for measurement when performing the measurement on the measurement sample 22 in step S13, all the measurement sample 22 is sucked from the container and used for measurement. In this way it is possible to appropriately acquire the target number of cell images using a sufficient amount of the measurement sample 22 by limiting the amount of the measurement sample 22 used for acquiring the cell concentration.

Note that, in step S12, the suction unit 15 also may suction all the measurement sample 22 stored in the container, and may send a part of the suctioned measurement sample 22 to the processing unit 11 in order to acquire the cell concentration. In this case, when the measurement on the measurement sample 22 is performed in step S13, the suction unit 15 sends the remainder of the measurement sample 22 suctioned in step S12 to the processing unit 11. In step S13, if the measurement on the measurement sample 22 is not performed, the suction unit 15 discharges the remaining measurement sample 22 to the original container.

In the measurement of step S13, the processing unit 11 causes the measurement sample 22 suctioned by the suction unit 15 to flow into the flow path 111 of the flow cell 110, irradiates the flow path 111 with the light from the light sources 121 to 124, and the generated fluorescence and the light transmitted through the measurement sample 22 are captured by the imaging unit 154 to obtain first to third images and bright field images as shown in FIG. 2A. The processing unit 11 causes the storage unit 12 to store the acquired first to third images and bright-field images.

In step S14, the processing unit 11 determines whether the operator has interrupted the measurement based on the measurement interruption flag. The measurement interruption flag is information for specifying whether an instruction to suspend measurement has been input by the operator, and is stored in the storage unit 12. The value of the measurement interruption flag is set to 0 in advance when the measurement is started in step S13. When the value of the measurement interruption flag is 1, the processing unit 11 determines that an instruction to stop the measurement has been input by the operator, and when the value of the measurement interruption flag is 0, the processing unit 11 determines that an instruction to stop the measurement has not been input by the operator. The setting of the measurement interruption flag will be described later with reference to FIG. 5.

When the value of the measurement interruption flag is 1, the processing unit 11 does not perform the processes in step S15 and step S16, and ends the measurement of the cell and the analysis of abnormal cells on the measurement sample 22. On the other hand, if the value of the measurement interruption flag is not 1, the processing section 11 advances the processing to step S15 and continues the measurement.

In step S15, the processing unit 11 performs processing on the cell images in order to make the cell images captured by the imaging unit 154 suitable for analysis. Specifically, the processing unit 11 performs processing such as removing noise from the first to third images and the bright field image, adjusting the background, and the like.

In step S16, the processing unit 11 performs analysis. Specifically, based on the first to third images processed in step S15, the processing unit 11 counts the cells whose bright spots are the negative patterns shown in FIG. 3A, that is, negative cells, based on the first to third images processed in step S15. In addition, the processing unit 11 counts cells, that is, positive cells, whose bright spots are any of the positive patterns 1 to 3 shown in FIGS. 3B to 3D, based on the first to third images. The processing unit 11 also calculates the ratio of positive cells to all cells by dividing the number of positive cells by the total number of cells. Then, the processing unit 11 displays the analysis result on the display unit 13. In this way the detection of abnormal cells using the sample processing apparatus 10 according to the first embodiment is completed.

When the analysis result of the cell is displayed on the display unit 13, the physician or the like can use the analysis result for determining whether it is positive or negative for the sample. Note that when the proportion of positive cells exceeds a predetermined threshold value, the processing unit 11 may perform a display that suggests that a sample is positive, that is, "Possible positive?".

Next, the calculation of the required time and its display will be described with reference to FIGS. 5 to 7F. Note that in the flowchart of FIG. 6 the state at the time of start is not particularly limited insofar as the measurement is performed without interruption. FIGS. 7A to 7F are examples of display screens displayed on the display unit 13. In FIGS. 7A to 7F, numbers are written as appropriate for the purpose of illustration, but not limited thereto.

Figure 5:
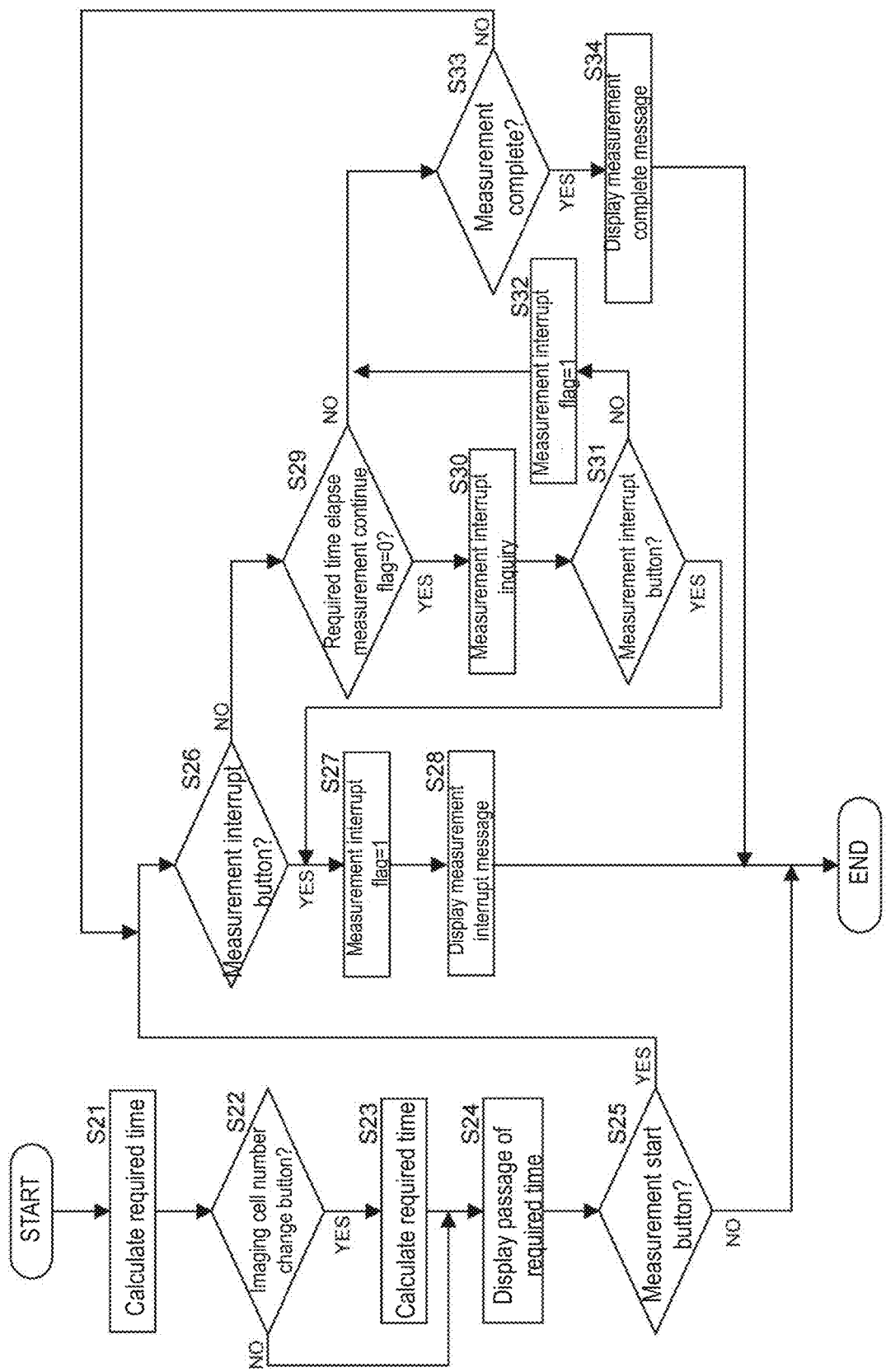
FIG. 5 is a flowchart describing the calculation of the required time required for imaging a predetermined number of cell images and the display of the required time for imaging a predetermined number of cell images and displaying the required time based on the cell concentration information contained in the measurement sample of the sample processing apparatus of the first embodiment.

The flowchart of FIG. 5 is started from the time when the processing unit 11 completes the measurement of the cell concentration of the measurement sample 22. In step S21, the processing unit 11 calculates the time required for cell imaging, based on the cell concentration of the measurement sample 22 acquired in step S12 of FIG. 4 and the number of imaging cells. For example, the processing unit 11 divides the number of imaging cells by the cell concentration and calculates the time required for flowing the measurement sample 22 at a volume obtained by that division to the flow cell 110. The time calculated here is the time required to capture a predetermined number of cell images. The number of imaging cells used in step S21 may be a number set by the operator before starting the measurement or may be a predetermined number stored in advance in the storage unit 12 for each cell measurement item.

Here, in step S21, the processing unit 11 also may calculate, as the required time, a time obtained by adding a predetermined time considering an error to the required time calculated as described above. When the time considering the error is not added, there may be cases where the number of cells measured does not reach the set number of imaging cells even when the required time has elapsed since the measurement was started. The reason for this is that the measurement sample is prepared through various treatments such as pretreatment and a predetermined amount of measurement sample 22 is used at the stage of measuring the cell concentration. In these cases, since the cell concentration of the measurement sample 22 is lower than the cell concentration acquired in step S12 of FIG. 4, the timing at which the required time elapses and timing at which the number of cells measured reach the set number of imaged cells may deviate. When such timing deviation becomes a problem, the two timings can approach each other if the time added with the predetermined time considering the error is calculated as the required time.

As described above, the required time calculated in step S21 in the first embodiment is a concept including a time added with a predetermined time considering an error to the required time calculated based on the above calculation. Note that, in steps S23 and S43 to be described later, the time required for adding the predetermined time considering the error to the required time calculated based on the above calculation also may be calculated as the required time.

In step S21, the processing unit 11 causes the storage unit 12 to store the cell concentration, the number of imaging cells, and the calculated required time and causes the display unit 13 to display same. The operator confirms this display and selects whether to change the number of imaging cells.

As shown in FIG. 7A, "setting" and "change" buttons are displayed next to "the number of imaging cells". In step S22, the processing unit 11 determines whether the imaging cells change button has been operated. When the operator changes the number of imaging cells by operating the change button, in step S23, the processing unit 11 calculates the required time according to the changed number of cells. In step S24, the processing unit 11 causes the display unit 13 to display the changed required time. As shown in FIG. 7A, in the initial state, for example, the "number of imaging cells" is 10,000 cells/µl. From this state, when the operator changes the number of imaging cells to 20,000, the required time is calculated in step S23, and the required time to be displayed is 20 minutes.

On the other hand, if the operator has not operated the change button, the processing unit 11 advances the process from step S22 to step S24 without performing the process of step S23. In this case, in step S24, the processing unit 11 displays the required time calculated in step S21 on the display unit 13.

Here, as shown in steps S22 to S24 in FIG. 5, the number of imaging cells is changed before the start of the measurement, but also may be performed after the measurement is started. A physician or the like may reconsider that normally a larger number than the predetermined number of cells necessary for the measurement should be analyzed based on the condition of the subject, for example, the progress of the disease and the like. Alternatively, although a physician or the like may have considered measuring more frequently, the physician also may reconsider that a predetermined number of captured images are sufficient. If it is possible to accept the change in the number of imaging cells after the start of the measurement, even when the above-described investigation is performed after the start of the measurement, the number of imaging cells can be changed, thereby improving convenience.

Figure 6:
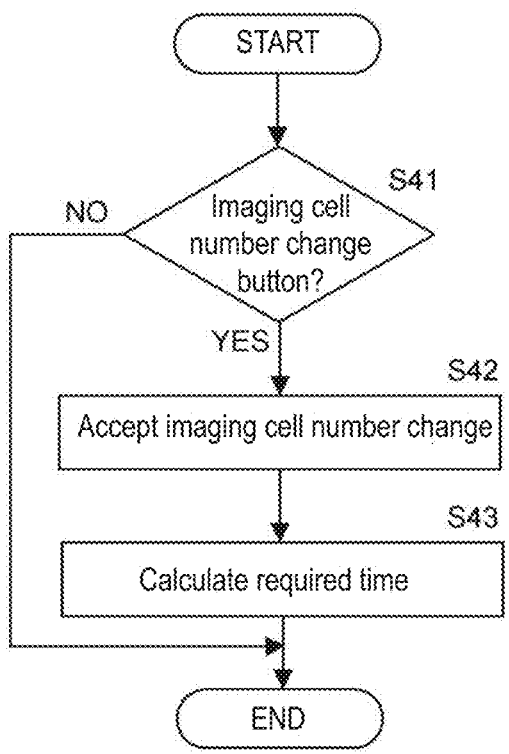
FIG. 6 is a flowchart illustrating acceptance of a change in the number of imaging cells according to the first embodiment.

Specifically, the processing shown in FIG. 6 is repeatedly performed in parallel with the processing shown in FIG. 5 even after the measurement is started. As shown in FIG. 6, in step S41, the same processing as step S22 is performed. When the operator changes the number of imaging cells, in step S42, the processing unit 11 accepts a change in the number of imaging cells. In step S43, the processing unit 11 calculates the required time according to the number of imaging cells after the change. On the other hand, if the operator has not changed the number of imaging cells, the processing unit 11 does not recalculate the required time and ends the processing shown in FIG. 6. Then, the processing unit 11 starts the process again from step S41 and accepts a change in the number of imaging cells until the measurement is completed.

In step S25, the processing unit 11 determines whether the "start measurement" button has been operated by the operator. As shown in FIG. 7A, a YES button and a NO button are displayed next to the message "Start measurement?". When the operator operates the YES button to start the measurement, the processing unit 11 starts measurement of cells and advances the process to step S26. On the other hand, when the operator does not start the measurement, that is, when the NO button is operated to end the measurement, the processing section 11 terminates the process of FIG. 5 without analyzing the cells.

When measurement of the cells is started in step S25, the processing unit 11 displays on the display unit 13 a message of "Measurement in progress" from the time when the measurement is started to the present time and the number of imaged cells are displayed, as shown in FIG. 7B. In order to make it easier for the operator to grasp the elapsed time and the number of cells imaged, a progress scale may be displayed. For example, on the display screen shown in FIG. 7B, "10" which is half the required time is displayed on the axis of the required time, and the number of imaged cells is half the number of imaging cells of "10000" is displayed on the imaged cell number axis.

As shown in FIG. 7B, on the display screen of the sample processing apparatus 10, a measurement interruption button is displayed so as to accept interruption of measurement by the operator. When the measurement interruption button is operated by the operator, the processing section 11 displays a YES button and a NO button on the display unit 13 together with a message "Stop measurement?" as shown in FIG. 7C. In step S26, the processing unit 11 determines whether the YES button has been operated by the operator on the screen of FIG. 7C. When the operator operates the YES button, in step S27, the processing unit 11 sets the value of the measurement interruption flag to "1" indicating that the measurement is interrupted. When the NO button is operated by the operator on the screen of FIG. 7C, the display screen returns to the state shown in FIG. 7B, and the measurement by the processing section 11 continues. In this way the operator has an opportunity to reconsider whether to interrupt the measurement.

In step S28, the processing unit 11 causes the display unit 13 to display a message "Measurement interrupted" as shown in FIG. 7D. The operator who saw this display operates the OK button next to the message. When the OK button in FIG. 7D is operated, the processing unit 11 interrupts the measurement and ends the processing in FIG. 5 without analyzing the cells. In this case, since the value of the measurement interruption flag is 1, YES is determined in step S14 of FIG. 4.

When the operator does not operate the measurement interruption button shown in FIG. 7B or when the NO button shown in FIG. 7C is operated, the processing unit 11 advances the process from step S26 to step S29. In this way the processing unit 11 causes the display unit 13 to display the screen shown in FIG. 7B, and continues the measurement.

In step S29, the processing unit 11 determines whether the last required time calculated in steps S21, S23, and S43 has elapsed since the measurement was started and whether the value of the measurement continuation flag is 0. The measurement continuation flag is information for specifying whether an instruction to continue measurement has been input by the operator, and is stored in the storage unit 12. The value of the measurement continuation flag is set to 0 in advance when the measurement is started in step S13.

When the required time has elapsed and the value of the measurement continuation flag is 0, the processing unit 11 advances the processing from step S29 to step S30. In other cases, the processing unit 11 advances the processing from step S29 to step S33.

In step S30, the processing unit 11 makes an inquiry about interruption of measurement to the operator. Specifically, as shown in FIG. 7F, the processing unit 11 displays a YES button and a NO button on the display unit 13 together with a message the "Required time has been exceeded. Continue measurement?". On the inquiry screen shown in FIG. 7F, the operator operates the YES button when selecting to continue the measurement. In this case, the processing unit 11 advances the processing from step S31 to step S32. In step S32, the processing unit 11 sets the value of the measurement continuation flag to 1.

If the required time has elapsed, the operator may desire to interrupt the measurement. In this case, the operator operates the NO button on the inquiry screen shown in FIG. 7F. When the NO button is operated, the processing unit 11 advances the process from step S31 to step S27. Then, the processing unit 11 performs the processing of steps S27 and S28 and ends the process of FIG. 5. In this case, YES is also determined in step S14 of FIG. 4 since the value of the measurement interruption flag is 1.

In step S33, the processing unit 11 determines whether the measurement is completed as the measured number of cells reaches the set number of imaging cells. When the measurement is completed, the processing unit 11 displays an OK button together with a message "measurement complete" in step S34, as shown in FIG. 7E. The operator who saw this display operates the OK button next to the message. When the OK button in FIG. 7E is operated, the processing unit 11 terminates the process in FIG. 5. Thus, the measurement is completed.

Note that when an instruction to suspend measurement is input by the operator in steps S28 and S31, the processing unit 11 may cause the storage unit 12 to store the cell images captured up to the interruption. As a result, the operator can acquire the cell information until the interruption.

As described above, when the required time is calculated and the calculated required time is displayed on the screen, the operator can continue the measurement without apprehension such as whether a malfunction has occurred in the apparatus when the required time becomes lengthy.

Note that, in the sample processing apparatus 10 according to the first embodiment, although the "required time" is the time required for the imaging unit 154 to capture a predetermined number of cell images, the time for processing the cell images obtained in step S15 of FIG. 4 also may be included when calculating the "required time". That is, the required time may be the time required to capture a predetermined number of cell images and further include the time required for processing the captured images.

The "required time" also may include the time required for the analysis of the images processed by the imaging unit 154 performed in step S16 in FIG. 4. In this way, the operator can comprehensively grasp the time required for cell measurement by calculating the time from the imaging of the cell to the analysis of the captured images as the required time. As a result, the operator can smoothly measure the cells.

First Modification

Figure 8B:
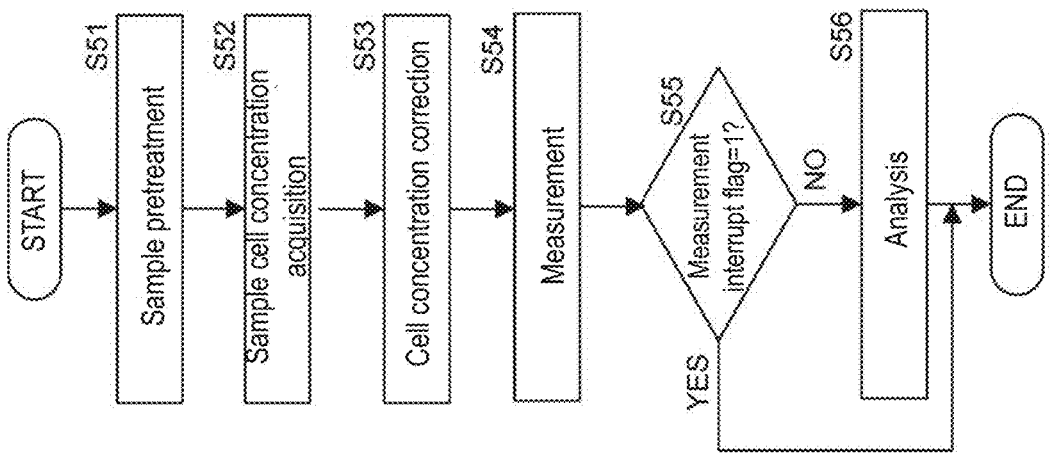
FIG. 8B is a flowchart describing the measurement and analysis of the measurement sample by the sample processing apparatus.
Figure 8A:
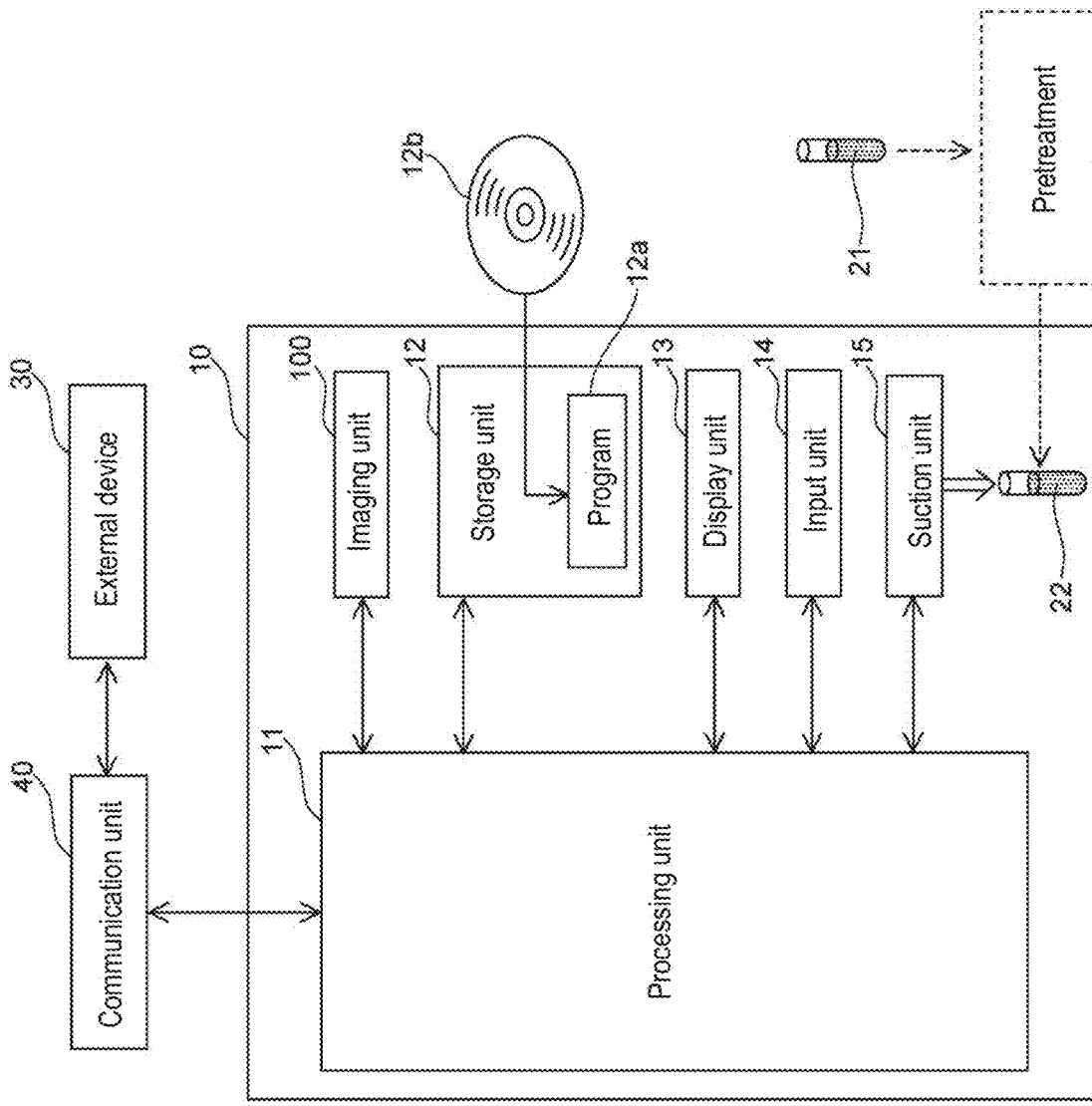
FIG. 8A is a brief structural diagram of the sample processing apparatus.

As shown in FIG. 8A, the sample processing apparatus 10 according to the first modification of the first embodiment is connected to an external device 30 via a communication unit 40 that can communicate with the external device 30. Other structures of the first modification are the same as those of the first embodiment.

In the first modification, the cell concentrations of the samples 21 are measured in advance by a measuring device capable of measuring the cell concentration, and the measured cell concentrations are aggregated in the external device 30 together with the identification information of the samples 21, that is, the sample ID. The external device 30 is a host computer that manages the measurement results of the samples 21 before the pretreatment, that is, the measurement results of the measurement device that measures the samples. The external device 30 acquires the cell concentration of each sample 21 from the measuring device through the network line and stores it in the storage unit. In the external device 30, the cell concentration of the sample 21 before the pretreatment is performed is stored for each sample ID.

In step S51 of FIG. 8B, pretreatment is performed on the sample 21 in the same manner as step S11 in FIG. 4. The container containing the pretreated measurement sample 22 is set in the sample processing apparatus 10. This container is given the same sample ID as sample 21. The operator inputs the sample ID attached to the container via the input unit 14. When a barcode including a sample ID is attached to the container, the operator may read the barcode of the container using a barcode reader attached to the sample processing apparatus 10.

In step S52, the processing unit 11 transmits a cell concentration acquisition request to the external device 30 together with the input sample ID. The external device 30 transmits the cell concentration associated with the received sample ID to the processing unit 11. In this way the processing unit 11 acquires the cell concentration of the set sample 21 from the external device 30.

In step S53, the processing unit 11 corrects the cell concentration of the sample 21 acquired from the external device 30 in step S51.

The measurement sample 22 is prepared by subjecting the sample 21 to pretreatment. In the sample 21 before pretreatment is performed, the concentration of the cells may change due to a decrease in the number of cells, a change in the amount of liquid other than cells, or the like in the course of pretreatment. Therefore, in many cases the cell concentration of the sample 21 stored in the external device 30 is often different from the cell concentration of the measurement sample 22 used for measurement in the sample processing apparatus 10.

In step S53, the processing unit 11 executes a process of correcting the difference in cell concentration between the sample 21 and the measurement sample 22. Generally, whether cell concentration has changed can be statistically determined in pretreatment according to the contents of pretreatment. Correction values of the cell concentration which change according to the pretreatments are stored in the storage unit 12 of FIG. 8A. The processing unit 11 reads the correction value from the storage unit 12 during the correction of the cell concentration of the sample 21, and corrects the cell concentration acquired from the external device 30 by the correction value. Then, the processing unit 11 stores the corrected cell concentration in the storage unit 12. In this way the processing unit 11 can acquire a cell concentration having the same degree of accuracy as when acquiring the cell concentration from the measurement sample 22. Therefore, the processing unit 11 can calculate the required time with high accuracy.

In step S53, the processing unit 11 corrects the cell concentration of the sample 21 to acquire the cell concentration of the measurement sample 22, and the processing unit 11 calculates the required time based on the acquired cell concentration of the measurement sample 22. Then, the processing unit 11 causes the storage unit 12 to store the calculated necessary time.

In steps S54 to S56, processing similar to steps S13 to S15 of FIG. 4 is performed. Here, in step 54, when the measurement sample 22 that has been pretreated by the operator is set in the sample processing apparatus 10, the entire amount of the measurement sample 22 is suctioned by the suction unit 15 and sent to the processing unit 11.

In the first modification, the same processing as in FIGS. 5 to 7F of the first embodiment also is performed for the calculation of the required time and its display.

Note that in the first modification, when the operator interrupts the measurement in steps S28 and S31, the cell images captured up to the interruption also may be stored in the storage unit 12. In this way the operator can grasp the cell information acquired up to the interruption.

Since all the measurement samples 22 after pretreatment can be used for measurement according to the configuration of the first modification, the configuration of first modification is particularly advantageous when a small amount of sample is collected. In recent years there is a tendency that the amount of a sample collected from a subject is adjusted to a small amount in order to avoid causing the subject pain as much as possible. When the subject is an infant, the amount of the sample to be collected also is limited. In such a case, the amount of the sample, that is, the sample 21, is a small amount before the pretreatment, and the amount of the measurement sample 22 prepared based on the sample 21 also becomes small. In such a case, all the prepared measurement sample 22 can be used for measurement and measurement can be appropriately performed even when the amount of collected sample is small according to the configuration of first modification. Since the cell concentration fluctuation due to pretreatment is corrected, the operator can grasp the required time with high accuracy.

Note that although the cell concentration of the sample 21 is acquired from the external device 30 in the first modification described above, it may also be assumed that the external device 30 is not installed or that the cell concentration of the measurement sample 22 set in the sample processing apparatus 10 is not yet stored in the external device 30. In order to deal with such cases, a configuration may be adopted in which the operator directly inputs the cell concentration of the sample 21 measured in advance by another device into the sample processing apparatus 10. In this case, the cell concentration of the sample 21 is input in step S52. The processing unit 11 then stores the input cell concentration in the storage unit 12. The processing after step S53 is the same as above.

Second Modification

Figure 9:
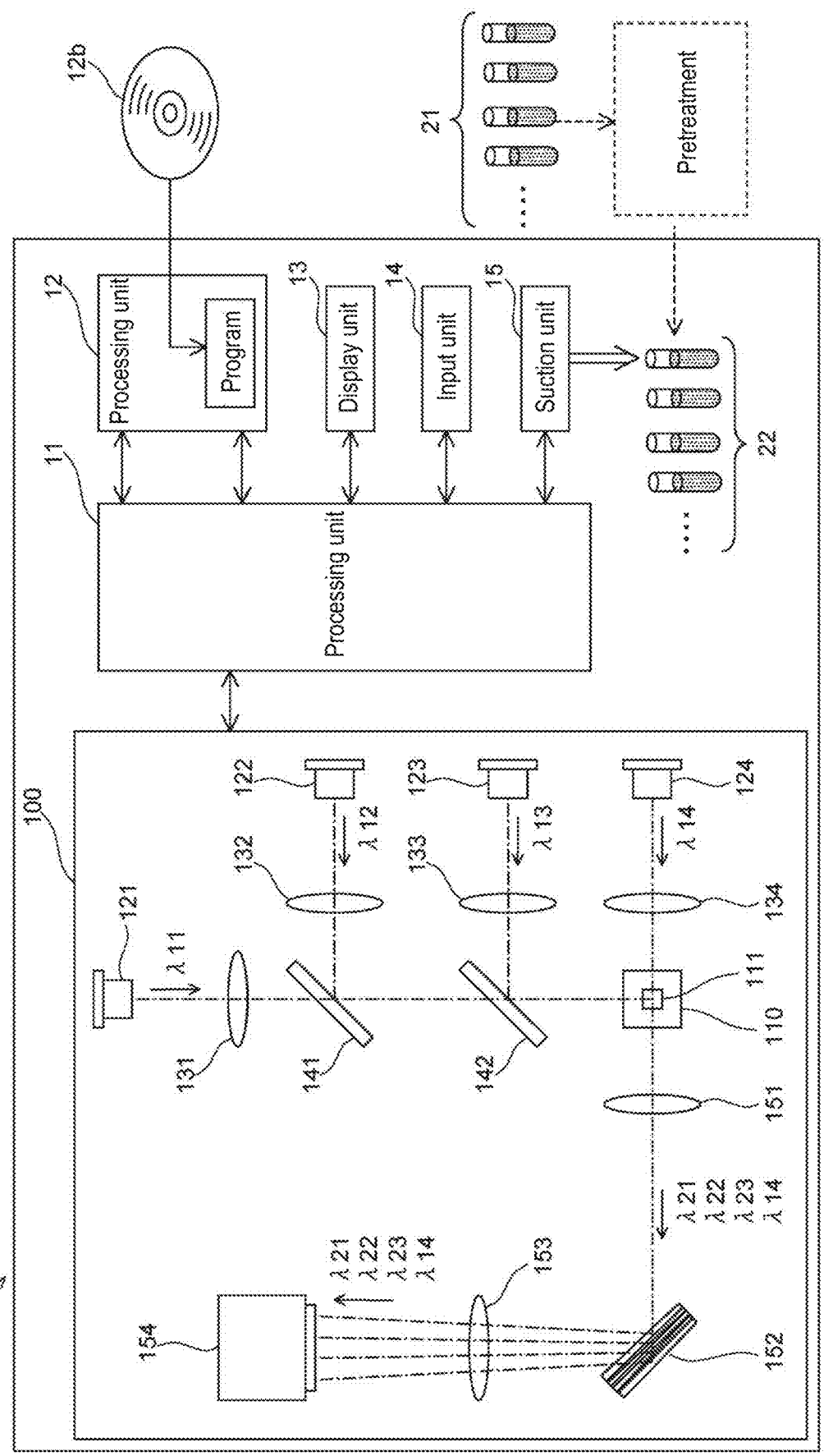
FIG. 9 is a brief structural diagram of a sample processing apparatus according to a second modification of the first embodiment.

The sample processing apparatus 10 according to the second modification of the first embodiment handles a plurality of measurement samples 22. As shown in FIG. 9, the configuration of the second modification is similar to that of the first embodiment shown in FIG. 1 except that a plurality of measurement samples 22 are suctioned by the suction unit 15, and the description is therefore omitted.

Processing including capture of a cell image included in a sample taken from a subject and analysis of the captured image by the sample processing apparatus 10 according to second modification of the first embodiment is similar to that of the sample processing apparatus 10 according to the first embodiment and corresponds to FIG. 2A to FIG. 4.

In step S11 of FIG. 4, the operator performs pretreatment of the plurality of samples 21 in sequence to prepare the measurement samples 22.

In step S12 of FIG. 4, the operator sets a plurality of pretreated measurement samples 22 in the sample processing apparatus 10. In the second modification, the sample processing apparatus 10 is configured so that a plurality of containers containing different measurement samples 22 can be set. The suction unit 15 sequentially suctions the measurement sample 22 from each container and sends it to the processing unit 11. The processing unit 11 acquires the concentration information of the cells contained in each measurement sample 22, and stores the acquired cell concentrations in the storage unit 12. The specific method for obtaining the concentration of cells is the same as in the first embodiment. Here, the cell concentration is acquired for all the pretreated measurement samples 22. In this way the first suction is performed by the suction unit 15 for all the plurality of measurement samples 22.

Next, the calculation of the required time and its display will be described in detail with reference to FIGS. 5, 6, and 9 to 14. Since the flowchart relating to the calculation of the required time in the second modification corresponds to FIGS. 5 and 6 of the first embodiment, the calculation of the required time will be described with reference to FIGS. 5 and 6. The aspects different from the first embodiment will be explained as appropriate. Note that in the flowchart of FIG. 14, as in the flowchart of FIG. 6, the state at the time of start is not particularly limited insofar as the measurement is performed without interruption. FIGS. 10A to 13B are examples of display screens displayed on a screen arranged at a predetermined position of the sample processing apparatus 10. In FIGS. 10A to 13B, numbers are written as appropriate for the purpose of illustration, but not limited thereto.

As shown in FIG. 10A, on the display screen of the sample processing apparatus 10, "Order", "Sample ID", "Measurement item", "Cell concentration (number/pt)", "Number of imaging cells (count)", "Required time (minutes)", and "Selection" are provided so that these pieces of information on a plurality of measurement samples 22 can be input. Among them, the columns of "Order", "Number of imaging cells (count)", and "Selection" can be changed by the operator. "Required time (minutes)" is recalculated and displayed by the processing unit 11 when the "number of imaging cells (count)" is changed.

When a plurality of measurement samples 22 are sent to the processing unit 11, the processing unit 11 calculates the respective required time based on the cell concentration of each measurement sample 22 and the number of imaging cells, as in step S21 of FIG. 5. The processing unit 11 causes the storage unit 12 to store the required times. Further, as shown in FIG. 10A, the processing unit 11 causes the display unit 13 to display the sample ID, the measurement item, the cell concentration, the number of imaging cells, and the required time for each measurement sample 22.

In addition to the calculation of the required time, the processing unit 11 also prescribes the order in which the operator should perform the measurements of the samples under predetermined conditions in step S21. The processing unit 11 causes the display unit 13 to display this order in the "Order" column. The predetermined condition may be, for example, a condition that "measurements are performed in order from samples with short required time" or conditions in which "measurements are performed in order from samples with a small number of imaging cells". This condition also may be set in the apparatus before the start of the measurement by the operator or may be stored in the storage section 12 in advance.

As shown in FIG. 10A, "setting" and "change" buttons are displayed on the display screen. In step S22 of FIG. 5, when the operator operates the change button, the processing unit 11 accepts a change in the number of imaging cells. When the operator changes the number of imaging cells and operates the setting button, the process proceeds from step S22 to step S23, and in step S23 the processing unit 11 calculates the required time according to the changed number of cells. In step S24, the processing unit 11 causes the display unit 13 to display the required time calculated in step S23.

For example, in FIG. 10A, "10,000" is displayed as the number of imaging cells of sample IDs "20386" and "235", respectively. When the operator changes the number of imaging cells of the sample IDs "20386" and "235" to 20,000 and 5,000 respectively, the processing unit 11 calculates the required time according to the number of cells after the change. In this way 20 minutes and 5 minutes are respectively displayed as the time required for the sample IDs "20386" and "235", as shown in FIG. 10B. Thus, one or more samples may be changed.

If the operator has not changed the number of imaging cells in step S22, the processing proceeds from step S22 to step S24, and the required time calculated by the processing unit 11 in step S21 remains displayed on the display unit 13. The change in the number of imaging cells is processed in the same manner as in FIG. 6 of the first embodiment. That is, except for a sample whose measurement has already been completed, a change in the number of imaging cells is accepted until the measurement of the plurality of measurement samples 22 is completed. Also in this case, one sample or a plurality of samples whose number of imaging cells is changed may be used.

In step S25 as in the first embodiment, the processing unit 11 determines whether the operator has operated the measurement start button. When there are a plurality of measurement samples 22, it is ideal to measure and analyze cells of all samples, but depending on operator's convenience, measurement may be difficult. In such a case, the operator selects the sample to be measured. For example, as shown in FIG. 10B, the operator selects the sample IDs "20386", "235", "658", and "12159". When the operator selects the sample, the background color is displayed in the corresponding field on the display screen so that the operator can easily see the sample. As shown in FIG. 11A, the selected samples also are rearranged in order from the top of the display screen.

After selecting the samples to be measured as described above, the operator selects whether to operate the measurement start button. As shown in FIGS. 10A, 10B, and 11A, "YES" and "NO" buttons are displayed on the display screen next to the message of "Start measurement?". In step S25, the processing unit 11 determines whether the YES button for starting measurement has been operated by the operator. When the operator operates the YES button to start the measurement, the processing section 11 advances the process from step S25 to step S26 and performs cell measurement according to the order displayed in "Order". On the other hand, when the operator does not start the measurement, that is, when the NO button is operated to end the measurement, the processing unit 11 terminates the process of FIG. 5 without analyzing the cells of all the samples.

When the operator selects measurement start, the processing unit 11 starts measurement. When the measurement start button is operated by the operator, the suction unit 15 performs a second suction on each measurement sample 22 and sends it to the processing unit 11. Specifically, as shown in FIG. 11A, since the sample ID "20386" is measured first, the measurement sample 22 corresponding to this sample ID is suctioned by the suction unit 15 and is sent to the processor 11. After the measurement of the sample ID "20386" is completed, the measurement sample 22 of the sample ID "235" to be measured second is suctioned by the suction unit 15. In this way each measurement sample 22 is suctioned by the suction unit 15 and sent to the processing unit 11 immediately before imaging the cells.

As shown in FIG. 11B, during the measurement, that is, during imaging of the cells, the message "Measurement in progress" is displayed together with the number of imaged cells and elapsed time from the start of measurement to the present on the display screen similar to the display screen of FIG. 7B. The display on the display screen also is a devised to make it easier for the operator to recognize which sample is being measured. For example, in FIG. 11B, the sample ID "20386" is displayed on the message "Measurement in progress" on the display screen, and the background color of this sample ID is a different color than the background of other samples on the list.

Figure 12A:
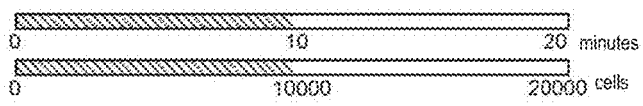
FIGS. 12A and 12B are diagrams describing a display screen according to the second modification of the first embodiment.
Figure 12B:
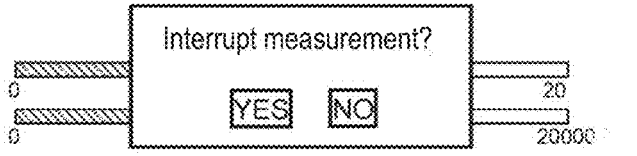

As shown in FIG. 12A, the "measurement interrupted" button also is displayed on the display screen similar to the display screen in FIG. 7B. When the operator operates the measurement interruption button, the processing unit 11 causes the display unit 13 to display the YES button and the NO button as shown in FIG. 12B. Then, the processing unit 11 performs the processing of steps S26 to S28 similar to the first embodiment. When the operator selects interruption of measurement, in step S28 the processing unit 11 displays on the display unit 13 a message "measurement interrupted" as shown in FIG. 13A. FIG. 12B corresponds to FIG. 7C, and FIG. 13A corresponds to FIG. 7D. Samples whose measurement has been interrupted also are marked in order to indicate which sample has been interrupted. In FIG. 13A, when the measurement of the sample ID "20386" is interrupted, the "selection" column is marked.

If the operator does not select interruption of measurement, the processing unit 11 advances the process from step S26 to step S29 and continues the measurement.

In the second modification as with the first embodiment, the processing unit 11 also performs the processing of steps S29 to S34. When the measurement of one sample is completed, in step S34 the processing unit 11 displays a message "measurement complete" as shown in FIG. 13B. Since the sample processing apparatus 10 measures a plurality of measurement samples 22, when the measurement of one sample is completed, the sample processing apparatus 10 automatically performs the measurement of the next sample.

Note that in the second modification of the first embodiment, when the operator selects interruption of measurement in steps S26 and S31, the cell images captured up to the interruption may be stored in the storage unit 12. As a result, the operator can acquire the cell information until the interruption.

Figure 14:
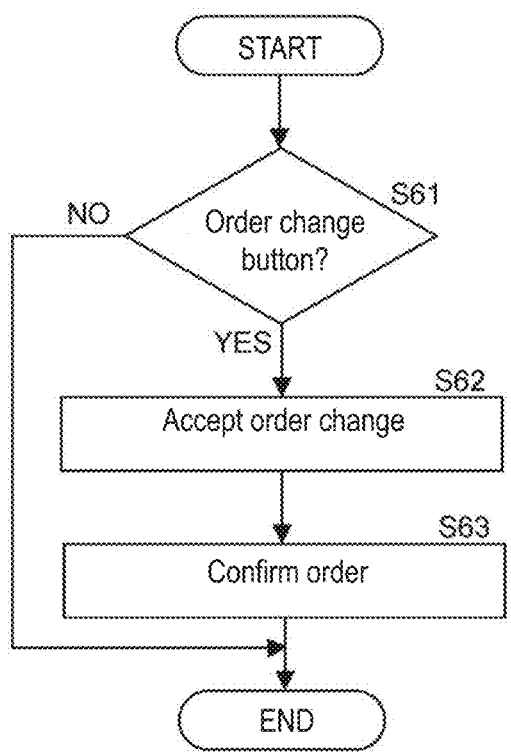
FIG. 14 is a flowchart illustrating acceptance of a change in measurement order according to the second modification of the first embodiment.

Here, a change of the measurement order will be described in detail. As shown in FIG. 10B, in order to accept the change of the measurement order by the operator, the "change" button is displayed on the display screen. As shown in FIG. 14, in step S61 the processing unit 11 determines whether the replacement button has been operated by the operator. When the operator operates the replacement button, in step S62 the processing unit 11 accepts the order change. Changing the order may be performed by directly inputting the order desired by the operator into the list, or the operator may operate the mouse to drag up and down the line of the sample or reorder the lines of samples in the desired order.

When the operator operates the setting button after changing the measurement order, the processing unit 11 determines the measurement order in step S63. Then, the processing unit 11 performs measurement in the newly updated order of measurement. Then, in accordance with the changed order, suction unit 15 suctions each measurement sample 22 and sends it to processing section 11 immediately before capturing the cell image.

On the other hand, if the operator does not change the measurement order, the processing unit 11 does not accept the change of the order of measurement and ends the process of FIG. 14. Then, the processing unit 11 starts the process again from step S61 and accepts a change in the measurement order until the measurement is completed.

Second Embodiment

Figure 15:
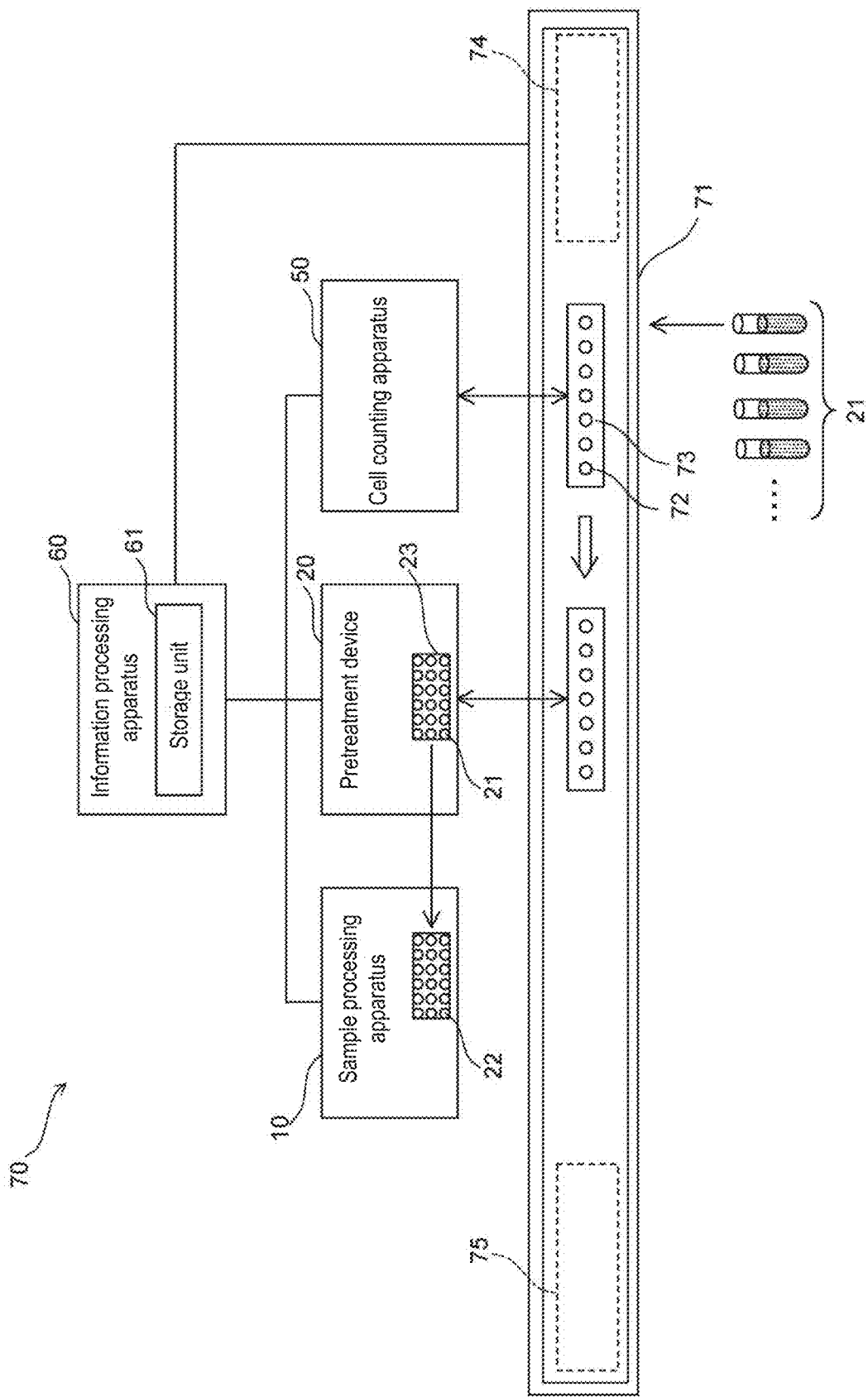
FIG. 15 is a brief structural diagram of a sample processing system according to the second embodiment.
Figure 16:
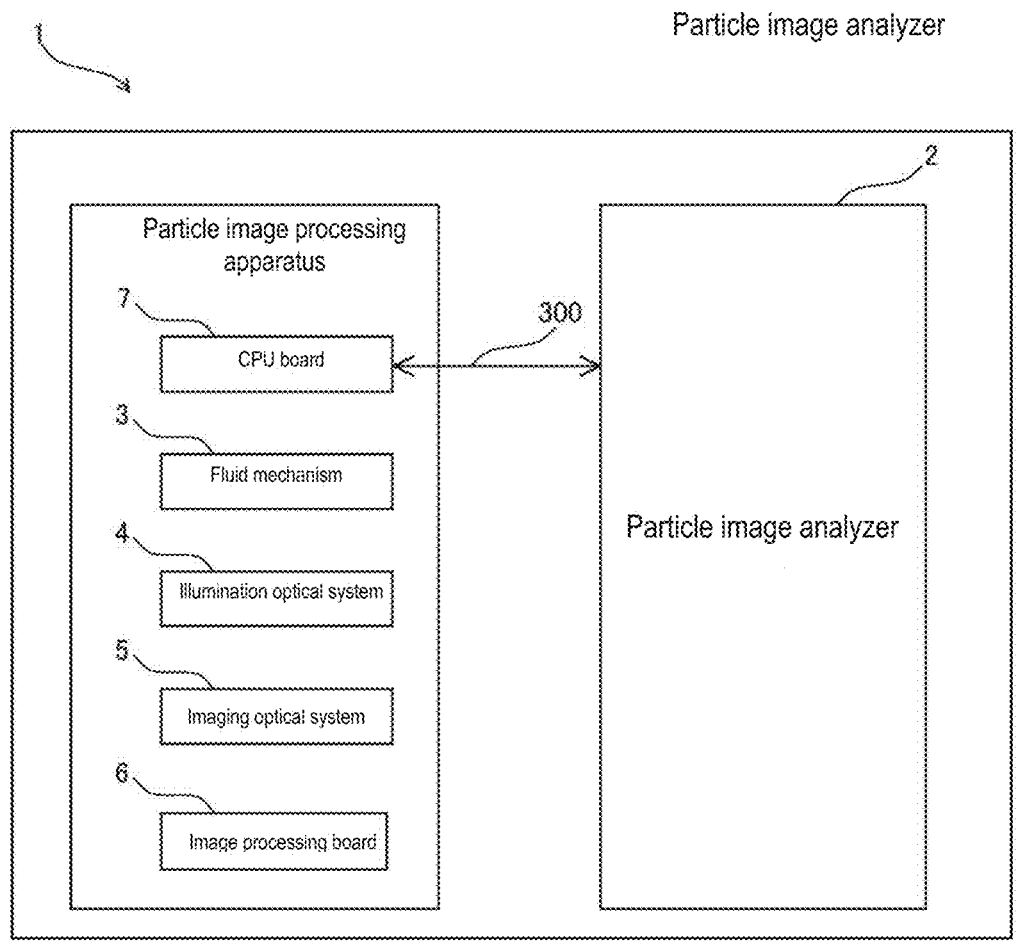
FIG. 16 is a block diagram describing the related art.

As shown in FIG. 15, in the second embodiment a sample processing system 70 is configured by the sample processing apparatus 10, the pretreatment device 20, the cell counting apparatus 50, and the information management apparatus 60. In addition, the sample processing system 70 is provided with a cell counting apparatus 50 and a transport unit 71 for transporting a sample to the pretreatment device 20. The sample processing apparatus 10 has the same configuration as that of the first embodiment. In the first embodiment, the pretreatment device 20 performs various processes on the sample, that is, the sample 21, in order to obtain the measurement sample 22 to be used for capturing the cell image.

The cell counting apparatus 50 measures the number of cells and the cell concentration in the sample 21. The cell counting device 50 is configured by, for example, a device for analyzing blood cells. The cell counting apparatus 50 includes, for example, a flow cytometer, and suctions the sample 21 with a suction unit (not shown), and counts cells contained in the suctioned sample 21 via a flow cytometer.

The transport unit 71 transports the sample container 72 that contains the sample and the sample rack 73 that holds a plurality of sample containers 72. A storage medium such as a barcode or the like is attached to each sample container 72 in order to identify each sample.

The information management apparatus 60 includes a storage unit 61 and controls the cell counting apparatus 50, the pretreatment device 20, the sample processing apparatus 10, and the transport unit 71 according to a program stored in the storage unit 61. The information management apparatus 60 is, for example, a personal computer. The storage unit 61 includes a storage medium such as a ROM, a RAM, and a hard disk, and stores programs and information necessary for controlling the information management apparatus 60.

Next, the operation of the sample processing system 70 will be described.

The sample container 72 containing the sample 21 is set in the sample rack 73. A sample 21 in an amount sufficient to allow executing both counting by the cell counting apparatus 50 and measurement by the sample processing apparatus 10 is accommodated in the sample container 72.

The operator sets the sample rack 73 on which the sample container 72 is set at the supply position 74 of the transport unit 71.

The transport unit 71 transports the sample container 72 held in the sample rack 73 to the cell counting apparatus 50. The cell counting apparatus 50 reads the sample ID from the bar code of the sample container 72 by the bar code reader. The cell counting apparatus 50 also suctions a predetermined amount of the sample 21 from the sample container 72, and executes the cell counting process. The cell counting is executed according to preset measurement items. When a plurality of sample containers 72 are held in the sample rack 73, the cell counting apparatus 50 performs suction on the samples 21 while sequentially reading the sample ID from all the sample containers 72, and performs measurement for each sample 21. The suction amount of the sample 21 by the cell counting apparatus 50 is limited to the amount necessary for counting cells according to the measurement item.

Next, the cell counting apparatus 50 counts the number of cells of the sample 21, and calculates the cell concentration based on the amount of the sample required for counting the number of cells of the sample 21. The cell counting apparatus 50 transmits the acquired cell number and cell concentration to the information management apparatus 60 in association with the measurement item and the sample ID. The cell concentration also may be calculated by the information management apparatus 60. In this case, the information management apparatus 60 calculates the concentration of cells contained in each sample 21 based on the number of cells received from the cell counting apparatus 50 and the preset suctioned amount of the sample 21.

Based on the cell concentration of each measurement item received from the cell counting apparatus 50, the information management apparatus 60 determines whether each sample 21 needs to be analyzed by the sample processing apparatus 10, and stores the determination result of each sample ID in the storage unit 61. At this time, the sample processing apparatus 10 stores the cell concentration received from the cell counting apparatus 50 in the storage unit 61 in association with the sample ID.

When measurement by the sample processing apparatus 10 is necessary for any one of the samples 21 of the sample container 72 held in the sample rack 73, the information management apparatus 60 controls the transport unit 71 to transport the sample container 72 to the pretreatment device 20. When analysis by the sample processing apparatus 10 is not required for any of the samples 21, the information management apparatus 60 transports the sample rack 73 to the collection position 75.

The pretreatment device 20 is provided with a plate 23 for transferring the sample 21 from the sample container 72. The plate 23 is provided with a plurality of accommodating portions, and the respective accommodating portions are given different identification numbers. The pretreatment device 20 suctions the sample 21 to be analyzed transported by the transport unit 71 from the sample container 72, and transfers the suctioned sample 21 to the storage portion of the plate 23. At this time, the pretreatment device 20 reads the sample ID from the barcode attached to the sample container 72 that contains the suctioned sample 21 via the barcode reader, and stores the read sample ID in the storage unit together with the identification number attached to the accommodation portion of the transfer destination of the sample 21. For example, when the sample 21 with the sample ID "10" is stored in the sample container 72 and this sample is transferred to the "1st" accommodating portion of the plate 23, the pretreatment device 20 stores information indicating that "the sample ID" 10 "has been transferred to the" 1st "accommodating portion of the plate 23" in the information management apparatus 60.

Thus, when all the samples 21 to be analyzed are transferred from the sample container 72 to the plate 23, the pretreatment device 20 subjects the samples 21 stored in the accommodating portion to pretreatment in the same manner as in the first embodiment to prepare measurement samples 22. When the pretreatment for all the samples 21 to be analyzed is completed, the pretreatment device 20 calculates the pretreatment type for each sample 21, and the number of the accommodating portion of the plate 23 accommodating each sample 21 and the sample ID are transmitted to the information management apparatus 60. The information management apparatus 60 stores the received information in the storage unit 61. The information management apparatus 60 controls the transport unit 71 to convey the sample rack 73 to the collection position 75.

The information management apparatus 60 moves the plate 23 containing the measurement samples 22 prepared by the pretreatment device 20 from the pretreatment device 20 to the sample processing apparatus 10. A path for moving the plate 23 is provided between the sample processing apparatus 10 and the pretreatment device 20. Pretreatment device 20 transmits information indicating that the plate 23 has been transferred to the sample processing apparatus 10 to the information management apparatus 60. In response to this, the information management apparatus 60 transmits the type of pretreatment for each sample 21 received from the pretreatment device 20 at the end of pretreatment, the number of the accommodating portion of the plate 23 accommodating each sample 21, and the number of samples 21 to the sample processing apparatus 10 together with the information on the cell concentration associated with each sample ID. The processing unit 11 of the sample processing apparatus 10 executes processing on each measurement sample 22 on the plate 23 based on the information received from the information management apparatus 60.

First, the processing unit 11 corrects the cell concentration of the measurement sample 22 accommodated in each accommodating portion of the plate 23 by the same process as that of step S53 of FIG. 8B. Specifically, the processing unit 11 obtains a cell concentration of the measurement sample 22 accommodated in each accommodating portion by applying a correction value corresponding to the type of pretreatment to the cell concentration acquired from the information management apparatus 60 for each accommodating portion. In this way the accuracy of the concentration of the cells in the measurement sample 22 can be improved.

Subsequently, the processing unit 11 captures the cell image and performs analysis of the captured image in the same manner as in steps S53 to S56 of FIG. 8B.

In the second embodiment as in the first embodiment, the processing unit 11 also calculates the required time based on the cell concentration acquired as described above, and displays the calculated required time on the display unit 13. The subsequent processing is the same as in the first embodiment.

According to the sample processing system 70, for example, cell count, pretreatment, and cell imaging and analysis can be automatically performed using the cell counting apparatus 50, the pretreatment device 20, and the sample processing apparatus 10. In this way these processes can be carried out easily and efficiently.

Note that in the sample processing system 70 according to the second embodiment, although the cell concentration measured by the cell counting apparatus 50 is configured to be corrected by the sample processing apparatus 10, the sample processing apparatus 70 according to the second embodiment also may be configured to obtain the cell concentration by measuring the measurement sample 22 transferred from the pretreatment device 20 to the sample processing apparatus 10. According to this configuration, although the amount of the measurement sample to be subjected to the measurement in the sample processing apparatus 10 is reduced as compared with the configuration of the second embodiment, the accuracy of the cell concentration measurement can be increased.

Other Embodiments

Although the target site is the BCR gene and the ABL gene in the above embodiments, the invention is not limited thereto, inasmuch as the target site may be another gene region such as HER 2 gene and CEP 17 which is a centromere region of chromosome 17. Translocation may occur in the BCR gene and the ABL gene in the case of chronic myelogenous leukemia, but, similarly, abnormality may be observed in specific gene regions even in specific diseases. When the target site is another gene region, the processing unit 11 also calculates the ratio of the number of positive cells to a specific disease or the number of positive cells to the number of detected cells, and displays the calculated number or percentage as the analysis result of the sample on the display unit 13.

The target site also is not limited to nucleic acid, but may be a cell surface or the like, or a substance other than cells. Labeling of the target site is not limited to hybridization, and may be performed by antigen-antibody reaction. In the pretreatment, processing such as centrifugal separation may be automatically performed. The sample to be pretreated is not limited to a blood sample, and may be, for example, a plasma sample or a sample collected from diseased tissue or the like. Cells to be analyzed are not limited to white blood cells, and may be epithelial cells, for example.

What is claimed is:

1. A sample processing apparatus comprising:
a light source configured to irradiate light to a measurement sample;
an imaging unit configured to image cells in the measurement sample irradiated with the light; and
a processing unit configured to:
acquire concentration information of the cells in the measurement sample by at least one of:
obtaining a number of cells contained in a predetermined amount of the measurement sample by a flow cytometry;
receiving, from an external device, the concentration information of the cells when a concentration information request is transmitted to the external device with an input sample identification; or
receiving, from a user, an input of the concentration information of the cells; and
calculate a time required for imaging the cells by the imaging unit based on the concentration information of the cells in the measurement sample before the cells are imaged by the imaging unit.

2. The sample processing apparatus according to claim 1, wherein
the required time includes the time required for processing an image captured by the imaging unit.

3. The sample processing apparatus according to claim 1, wherein
the required time includes the time required for analyzing an image captured by the imaging unit.

4. The sample processing apparatus according to claim 1, further comprising:
a display unit configured to display information;
wherein the processing unit is configured to display the calculated required time on the display unit.

5. The sample processing apparatus according to claim 4, wherein
the processing unit configured to accept a selection whether to perform measurement of the measurement sample.

6. The sample processing apparatus according to claim 5, wherein
the processing unit configured to cause the display unit to display a screen including a button for accepting a selection of whether to perform measurement of the measurement sample and the required time.

7. The sample processing apparatus according to claim 4, wherein
the processing unit is further configured to cause the display unit to display the concentration information of the cells.

8. The sample processing apparatus according to claim 4, wherein
the processing unit is configured to cause the display unit to display information on the progress of measurement of the measurement sample.

9. The sample processing apparatus according to claim 8, wherein
the information on the progress includes information on the elapsed time from the moment when the processing unit starts measuring the measurement sample to the present moment.

10. The information according to claim 8, wherein
the information on the progress includes information on the number of the cell images captured by the imaging unit during a period from the time when the processing unit starts measuring the measurement sample to the present time.

11. The sample processing apparatus according to claim 1, wherein
the processing unit is configured to accept a selection of whether to stop measuring the measurement sample on the basis of whether the elapsed time from the moment when the measurement of the measurement sample is started to the present moment exceeds the required time.

12. The sample processing apparatus according to claim 1, wherein
the processing unit calculates the time required capture cell images of the changed number of cells when the processing unit has performed a process for accepting a change in the number of cells to be captured and has accepted the change in the number of cells to be captured.

13. The sample processing apparatus according to claim 1, wherein
the processing unit is configured to measure a predetermined amount of the measurement sample to obtain cell concentration information before measuring and analyzing the measurement sample.

14. The sample processing apparatus according to claim 1, further comprising:
   a communication unit capable of communication with an external device;
   wherein the processing unit acquires concentration information of the cells based on information acquired from the external device via the communication unit.

15. The sample processing apparatus according to claim 1, wherein
   the processing unit is configured to accept input of concentration information of the cells.

16. The sample processing apparatus according to claim 1, wherein
   the cells to be imaged are nucleated cells.

17. The sample processing apparatus according to claim 1, further comprising:
   a flow cell through which a measurement sample flows;
   wherein the light source is configured to irradiate the measurement sample flowing through the flow cell; and
   the imaging unit is configured to capture the light given off from the measurement sample flowing through the flow cell.

18. The sample processing apparatus according to claim 1, further comprising:
   a display unit configured to display information;
   wherein the processing unit is configured to calculate the required time for each of the measurement samples based on the concentration information of the cells contained in the plurality of measurement samples, and displays a screen including a list of required time associated with the identification information of each measurement sample on the display unit.

19. A sample processing system comprising:
   the sample processing apparatus of claim 1; and
   a cell counting device configured to count cells included in a sample;
   wherein the processing unit of the sample processing apparatus obtains the count value of the cells from the cell counting device.

20. A method for calculating measurement time of a measurement sample including cells, the method comprising:
   acquiring concentration information of cells contained in the measurement sample by at least one of:
      obtaining a number of cells contained in a predetermined amount of the measurement sample by a flow cytometry;
      receiving, from an external device, the concentration information of the cells when a concentration information request is transmitted to the external device with an input sample identification; or
      receiving, from a user, an input of the concentration information of the cells;
   calculating a required time for cell imaging based on the acquired cell concentration information; and
   imaging the cells in the measurement sample irradiated with light, wherein calculating the required time is performed before imaging the cells.

* * * * *